(12) United States Patent
Miyamoto et al.

(10) Patent No.: US 7,771,279 B2
(45) Date of Patent: Aug. 10, 2010

(54) GAME PROGRAM AND GAME MACHINE FOR GAME CHARACTER AND TARGET IMAGE PROCESSING

(75) Inventors: Shigeru Miyamoto, Kyoto (JP); Keizo Ohta, Kyoto (JP); Hideya Akasaka, Kyoto (JP)

(73) Assignee: Nintendo Co. Ltd., Kyoto (JP)

( * ) Notice: Subject to any disclaimer, the term of this patent is extended or adjusted under 35 U.S.C. 154(b) by 986 days.

(21) Appl. No.: 10/925,034

(22) Filed: Aug. 25, 2004

(65) Prior Publication Data

US 2005/0187023 A1   Aug. 25, 2005

(30) Foreign Application Priority Data

Feb. 23, 2004  (JP)  ............................. 2004-046775

(51) Int. Cl.
*A63F 13/10*  (2006.01)
(52) U.S. Cl. ....................................................... 463/31
(58) Field of Classification Search ..................... 463/2, 463/8, 30–34, 37
See application file for complete search history.

(56) References Cited

U.S. PATENT DOCUMENTS

| | | | |
|---|---|---|---|
| 4,618,927 A * | 10/1986 | Hatta ............................ | 463/2 |
| 5,390,937 A * | 2/1995 | Sakaguchi et al. ............. | 463/7 |
| 5,410,494 A | 4/1995 | Hashimoto et al. | |
| 5,465,325 A | 11/1995 | Capps et al. | |
| 5,485,565 A | 1/1996 | Saund et al. | |
| 5,500,937 A | 3/1996 | Thompson-Rohrlich | |
| 5,592,608 A | 1/1997 | Weber et al. | |
| 5,596,656 A | 1/1997 | Goldberg | |
| 5,636,297 A | 6/1997 | Eller et al. | |
| 5,638,462 A | 6/1997 | Shirakawa | |
| 5,751,853 A | 5/1998 | Michael | |
| 5,798,769 A | 8/1998 | Chiu et al. | |
| 5,880,717 A | 3/1999 | Chan et al. | |
| 5,882,262 A | 3/1999 | Ballhorn | |
| 5,920,309 A | 7/1999 | Bisset et al. | |

(Continued)

FOREIGN PATENT DOCUMENTS

JP   58-066176   4/1983

(Continued)

OTHER PUBLICATIONS

Japanese Official Action issued for Japanese Patent Application JP2004-046775, dated Mar. 24, 2008.

(Continued)

*Primary Examiner*—Scott Jones
(74) *Attorney, Agent, or Firm*—Nixon & Vanderhye P.C.

(57) ABSTRACT

On a display screen, a game image including a plurality of target images and a game character image is displayed. The target images moves so as to pass over the game character image. When an input is provided from a player onto a touch panel, input coordinates are detected. In response, display coordinates of each target image at the time of the input are detected. When display coordinates located within a predetermined range from the input coordinates are present, specified coordinates are determined based on at least one of a position represented by display coordinates and a position represented by the input coordinates. The game character has characteristic parameters which are varied in accordance with a positional relation between the specified coordinates and the game character image.

49 Claims, 26 Drawing Sheets

U.S. PATENT DOCUMENTS

| | | | |
|---|---|---|---|
| 6,057,830 | A | 5/2000 | Chan et al. |
| 6,057,845 | A | 5/2000 | Dupouy |
| 6,149,523 | A * | 11/2000 | Yamada et al. ............... 463/31 |
| 6,165,073 | A * | 12/2000 | Miyamoto et al. ............ 463/32 |
| 6,244,956 | B1 | 6/2001 | Nakayama et al. |
| 6,278,445 | B1 | 8/2001 | Tanaka et al. |
| 6,335,977 | B1 | 1/2002 | Kage ......................... 382/107 |
| 6,461,237 | B1 | 10/2002 | Yoshinobu et al. |
| 6,482,086 | B1 | 11/2002 | Rimoto et al. |
| 6,482,090 | B1 | 11/2002 | Rimoto et al. |
| 6,493,736 | B1 | 12/2002 | Forcier |
| 6,626,760 | B1 * | 9/2003 | Miyamoto et al. ............ 463/33 |
| 6,668,081 | B1 | 12/2003 | Ilan et al. |
| 6,738,049 | B2 | 5/2004 | Kiser et al. |
| 6,761,632 | B2 * | 7/2004 | Bansemer et al. ............ 463/16 |
| 6,966,837 | B1 | 11/2005 | Best |
| 7,004,394 | B2 | 2/2006 | Kim |
| 7,056,210 | B2 | 6/2006 | Bansemer et al. |
| 7,098,896 | B2 | 8/2006 | Kushler et al. |
| 2001/0035859 | A1 | 11/2001 | Kiser et al. |
| 2002/0097229 | A1 | 7/2002 | Rose et al. |
| 2002/0141643 | A1 | 10/2002 | Jaeger |
| 2002/0155890 | A1 * | 10/2002 | Ha et al. ...................... 463/36 |
| 2003/0006967 | A1 | 1/2003 | Pihlaja |
| 2003/0063115 | A1 | 4/2003 | Baku et al. .................. 345/711 |
| 2003/0090474 | A1 | 5/2003 | Schaefer |
| 2003/0216177 | A1 * | 11/2003 | Aonuma et al. ............... 463/32 |
| 2004/0002380 | A1 | 1/2004 | Brosnan et al. |
| 2004/0014513 | A1 | 1/2004 | Boon |
| 2004/0063501 | A1 | 4/2004 | Shimokawa et al. |
| 2004/0085300 | A1 | 5/2004 | Matusis |
| 2004/0110560 | A1 | 6/2004 | Aonuma |
| 2004/0130525 | A1 | 7/2004 | Suchocki |
| 2005/0024341 | A1 | 2/2005 | Gillespie et al. |
| 2005/0052406 | A1 | 3/2005 | Stephanick et al. |
| 2005/0088409 | A1 | 4/2005 | Van Berkel ................. 345/157 |
| 2005/0164794 | A1 | 7/2005 | Tahara |
| 2005/0190973 | A1 | 9/2005 | Kristensson et al. |
| 2005/0270289 | A1 | 12/2005 | Momose |
| 2007/0010309 | A1 | 1/2007 | Giobbi et al. ................. 463/16 |

FOREIGN PATENT DOCUMENTS

| | | |
|---|---|---|
| JP | 62-082486 | 4/1987 |
| JP | 61-168347 | 2/1988 |
| JP | 01-177682 | 7/1989 |
| JP | 1-269185 | 10/1989 |
| JP | 03-282896 | 12/1991 |
| JP | 04-238585 | 8/1992 |
| JP | 06-012493 | 1/1994 |
| JP | 7-29002 | 1/1995 |
| JP | 07-093560 | 4/1995 |
| JP | A-H08-84863 | 2/1996 |
| JP | 08-084863 | 4/1996 |
| JP | 10-198760 | 7/1998 |
| JP | 11-134509 | 5/1999 |
| JP | 11-295090 | 10/1999 |
| JP | 2000-197767 | 7/2000 |
| JP | 2000-218046 | 8/2000 |
| JP | 2002-263360 | 9/2002 |
| JP | 3350009 | 9/2002 |
| JP | A-2002-263360 | 9/2002 |
| JP | 2002-282542 | 10/2002 |
| JP | 2003-79943 | 3/2003 |
| JP | 2003-334382 | 11/2003 |

OTHER PUBLICATIONS

Dragon Chronicle, Arcadia, Japan, Enterbrain, Inc., vol. 5, No. 1, Jan. 1, 2004.

TBD: "Electronic Calculator Based on Character Recognition of Input from Stylus Acceleration Dynamics," IBM Technical Disclosure Bulletin, pp. 2816-1827 (Dec. 1976).

Shilman, Michael et al., "Discerning Structure from Freeform Handwritten Notes," 6 pages.

Fonseca, Manuel et al., "Experimental Evaluation of an on-line Scribble Recognizer," 13 pages.

Kara, Levent Burak, Ph.D. Thesis Proposal, "Sketch Understanding for Engineering Software," 68 pages (Aug. 13, 2003).

Xin, Gong et al., "HMM based online hand-drawn graphic symbol recognition," ICSP'02 2002 6th International Conference on Signal Processing Proceedings, Part vol. 2, pp. 1067-1070 (2002).

Japanese Official Action issued for Japanese Patent Application JP2008-132478, dated Dec. 1, 2008.

U.S. Official Action issued for U.S. Appl. No. 10/928,344, dated Jul. 31, 2009.

Japanese Office Action issued for Japanese Application No. 2004-166128, dated Feb. 3, 2010.

* cited by examiner

FIG. 11

| ENEMY CHARACTER | HP | MP | FIRST DAMAGE AREA (×1) | SECOND DAMAGE AREA (×2) | THIRD DAMAGE AREA (×3) | TARGET IMAGE INFORMATION (SIZE) |
|---|---|---|---|---|---|---|
| ENEMY CHARACTER A | 50 | 35 | NORMAL BODY PART | EYE | SHIELD | REFERENCE VALUE × 1 |
| ENEMY CHARACTER B | 100 | 40 | NORMAL BODY PART | HEAD | LIMB | REFERENCE VALUE × 2 |
| ... | ... | ... | ... | ... | ... | ... |

FIG. 14

| SKILL INFORMATION (THE NUMBER OF TIMES OF SPECIFICATION) | TARGET IMAGE INFORMATION (SPEED) |
|---|---|
| 1 | REFERENCE SPEED×0.5 |
| 2 | REFERENCE SPEED×1 |
| 3 | REFERENCE SPEED×1.5 |
| 4 | REFERENCE SPEED×2 |

| AREA THROUGH WHICH TARGET IMAGE IS PASSING | TARGET IMAGE INFORMATION (SPEED) |
|---|---|
| FIRST DAMAGE AREA | REFERENCE SPEED × 1 |
| SECOND DAMAGE AREA | REFERENCE SPEED × 2 |
| THIRD DAMAGE AREA | REFERENCE SPEED × 0.5 |

| TARGET IMAGE | REFERENCE DAMAGE | SIZE |
|---|---|---|
| FIRST TARGET IMAGE | 10 | 1.5 |
| SECOND TARGET IMAGE | 20 | 1 |
| THIRD TARGET IMAGE | 30 | 0.5 |
| FOURTH TARGET IMAGE | 15 | 1 |
| FIFTH TARGET IMAGE | 5 | 3 |

GAME PROGRAM AND GAME MACHINE FOR GAME CHARACTER AND TARGET IMAGE PROCESSING

FIELD OF THE INVENTION

The illustrative embodiments relate to game programs and game machines. More specifically, the illustrative embodiments relate to a game machine prompting a player to enter an instruction by using a touch panel, and a game program to be executed on the game machine.

BACKGROUND AND SUMMARY OF THE INVENTION

One of the conventional teachings for game systems suggests that a player performs a timely input operation to proceed with a game. For example, a game system disclosed in Japanese Patent Laid-Open Publication No. 2000-218046 (hereinafter, a first patent document) is such that a player is supposed to specify an object moving on a screen at a specific time. This game system provides a game played by pressing a button when the object moving from top to bottom on the screen reaches a line on the screen.

In another game system (such as a game system disclosed in Japanese Patent No. 3350009, which is hereinafter referred to as a second patent document), the player performs a timely input operation, thereby attacking an enemy character displayed on a game system. In this game system, a plurality of targets (input units) are provided on the left and right sides of a display unit on which a game screen is displayed. These targets move forward and backward under the control of the game system. When the player hits one of the targets coming forward at the appropriate time, damage corresponding to an angle at which the target was hit is dealt to the enemy character on the game screen.

In the above-described conventional game systems, the player performs an input operation on a physically-fixed button or target. As such, the finger position at which the player performs an input operation is fixed, and therefore the player's personal feel for operation cannot be varied. Moreover, the player does not have to pay much attention to the fixed position of the button or target, but merely pays attention to when to perform an input operation. For example, in the game system disclosed in the first patent document, the player can easily perform an input operation in a timely manner, by merely paying attention to the time when a subject on the game screen reaches a specific position. As such, in the conventional game systems, the input operation to be performed by the player is too simple, and does not allow the operation skill of the player to be reflected on the input operation, making the game itself unsophisticated with less entertainment value.

Furthermore, in the conventional game systems, the player is supposed to perform an input operation when the subject on the game screen reaches a line or when the target comes forward. That is, all the player has to do is to perform an input operation when the subject or the target reaches a predetermined position. Therefore, the time at which the player is supposed to perform an input operation is predetermined. As such, in the conventional game systems, the player merely hits the predetermined button or target at the predetermined time, and thus the flexibility of player operation is low. Such low flexibility of player operation makes the game unsophisticated with less entertainment value.

Therefore, a feature of an illustrative embodiment is to provide a game machine with a game full of entertainment, with the operation skill of a player being more fully reflected in the game play, and a game program achieving such a game.

An illustrative embodiment adopts the following structure to achieve the feature mentioned above. Note that reference characters and numerals in parentheses below merely show examples of correspondence with the embodiment described further below for the sake of better understanding of the present invention, and do not restrict the scope of the present invention.

A first aspect of an illustrative embodiment is directed to a data storage medium having stored there in a game program causing a computer of a game machine (1), including a display screen (first LCD 11) for displaying a game image and a touch panel (13) covering the display screen, to perform steps including: a display control step (CPU core 21 performing S13, which is an abbreviation of step 13; only a step number is hereinafter referred), a movement control step (S16), an input coordinate detecting step (S17), a specified coordinate determining step (S53), and a parameter updating step (S67). In the display control step, a game image, including a game character image (enemy character 31) and a plurality of target images (32), indicative of targets to be specified by a player, is displayed on the display screen. In the movement control step, the target images are moved so that at least one of the target images passes over the game character image. In the input coordinate detecting step, when the player provides an input to the touch panel, input coordinates, indicative of a position of the input on the display screen, are detected. In the specified coordinate determining step, when display coordinates of any one of the target images, at the time of the input provided from the player onto the touch panel, and the input coordinates are within a predetermined range, it is determined that the target image has been specified by the player. Also, based on at least one of a position represented by the display coordinates and a position represented by the input coordinates, specified coordinates indicative of a position specified by the player are determined. Here, the "predetermined range" is, for example, a range in which the target image is displayed, or a range within a predetermined distance away from the range in which the target image is displayed. In the parameter updating step, a characteristic parameter, indicative of a characteristic of a game character, represented by the game character image, is varied, based on a positional relation between the specified coordinates and the game character image.

A second aspect of an illustrative embodiment is directed to a data storage medium having stored therein a game program, causing a computer of a game machine, including a display screen, for displaying a game image, and a touch panel covering the display screen, to perform steps including: a display control step (S13), a movement control step (S16), an input coordinate detecting step (S17), a specified coordinate determining step (S53), and a parameter updating step (S67). In the display control step, a game image, including a game character image and a target image, indicative of a target to be specified by a player, are displayed on the display screen. In the movement control step, the target image is moved so that target image passes over the game character image. In the input coordinate detecting step, when the player provides an input onto the touch panel, input coordinates indicative of a position of the input on the display screen are detected. In the specified coordinate determining step, when display coordinates, of the target image at the time of the input onto the touch panel, provided by the player, and the input coordinates are within a predetermined range, it is determined that the target image has been specified by the player. Also, based on at least one of a position represented by the display coordinates and a position represented by the input coordinates, specified coordinates, indicative of a position specified by the player, are determined. Note that the "predetermined range" is, for example, a range in which the target image is displayed, or a range within a predetermined distance away from the range in which the target image is displayed. In the parameter updating step, a characteristic parameter indicative of a characteristic of a game character, represented by the game character image, is varied based on a positional relation between the specified coordinates and the game character image.

Here, the steps may further include a movement stopping step (S54) of stopping the movement of the target image specified by the player when the specified coordinates are determined.

Also, in the parameter updating step, when the specified coordinates represent a position of the game character image, the characteristic parameter of the game character represented by the game character image may be varied.

Also, an area where the game character image is displayed may include a plurality of decision coordinate areas defined in association with the area. At this time, in the parameter updating step, a degree of variance of the characteristic parameter is changed in accordance with one of the decision coordinate areas that includes the specified coordinates.

Furthermore, the steps may further include a time keeping step (S15) of keeping an elapsed time from the start of the movement of the target images. At this time, the movement control step, the input coordinate detecting step, the display coordinate detecting step, and the specified coordinate determining step are repeated, until the elapsed time exceeds a predetermined limit time.

Still further, the steps may include a number-of-inputs counting step of counting the number of inputs provided from the player onto the touch panel, after the start of the movement of the target images. At this time, the movement control step, the input coordinate detecting step, the display coordinate detecting step, and the specified coordinate determining step are repeated until the number of inputs exceeds a predetermined number.

Still further, the game character image, displayed in the display control step, may be an image of at least one of a plurality of game characters stored in advance in the game machine. At this time, the steps further include a first changing step (S33) of changing at least one of a size, a number, a moving pattern, and a moving speed of each of the target images, changed in accordance with a type of the game character.

Still further, the steps may include: a skill information storing step (S56) and a second changing step (S31). In a skill information storing step, at least one of the number of points represented by the specified coordinates, determined within a predetermined time, a distance between the point represented by the input coordinates and the point represented by the display coordinates, and a ratio of the points represented by the specified coordinates, determined with the predetermined time with respect to the number of inputs provided onto the touch panel within the predetermined time, is stored as skill information of the player. In the second changing step, at least one of a size, a number, a moving pattern, and a moving speed of each of the target images, to be displayed after the skill information is stored, is changed in accordance with the skill information.

Still further, the steps may include a character movement control step of moving the game character image when the target images are moved.

Still further, the steps may include a moving speed changing step (S71) of changing a moving speed of the target image when the target image passes over an entire area or part of an area of the game character image.

Still further, an area where the game character image is displayed may include a plurality of decision coordinate areas defined in association with the area. At this time, in the moving speed changing step, the moving speed of the target image is increased when the target image passes over a predetermined one of the plurality of decision coordinate areas. In the parameter updating step, when the specified coordinates are included in the predetermined decision coordinate area, a degree of variance of the characteristic parameter is increased by a greater amount compared with a case where the specified coordinates are included in one of the decision coordinate areas other than the predetermined decision coordinate area.

Still further, the steps may include an image display changing step (S71) of decreasing a size of the target image when passing over an entire or part of the game character image. At this time, in the specified coordinate determining step, a size of the predetermined range is changed in accordance with the size of the target image.

An area where the game character image is displayed may include a plurality of decision coordinate areas defined in association with the area. At this time, in the image display changing step, the size of the target image is decreased when the target image passes over a predetermined one of the plurality of decision coordinate areas. In the parameter updating step, when the specified coordinates are included in the predetermined decision coordinate area, a degree of variance of the characteristic parameter is increased by a greater amount compared with a case where the specified coordinates are included in one of the decision coordinate areas other than the predetermined decision coordinate area.

Still further, the plurality of target images may be of types different in appearance. In the parameter updating step, the characteristic parameter is changed differently in accordance with a type of the target image represented by the specified coordinates.

A third aspect of an illustrative embodiment is directed to a data storage medium having stored therein a game program causing a computer of a game machine, including a display screen for displaying a game image and a touch panel covering the display screen, to perform steps including: a display control step (S13), a movement control step (S16), an input coordinate detecting step (S17), a specified coordinate determining step (S53), and a game image changing step (S84 and S85). In the display control step, a game image, including a game character image and a plurality of target images (32) indicative of targets to be specified by a player, is displayed on the display screen. In the movement control step, the target images on the game image are moved. In the input coordinate detecting step, when the player provides an input onto the touch panel, input coordinates indicative of a position of the input on the display screen are detected. In specified coordinate determining step, when display coordinates of any one of the target images at the time of the input, provided from the player onto the touch panel, and the input coordinates are within a predetermined range, specified coordinates indicative of a position specified by the player are determined based on at least one of a position represented by the display coordinates and a position represented by the input coordinates. In the game image changing step, a display state of the game image is changed, based on a positional relation among positions represented by the specified coordinates determined in the specified coordinate determining step.

The present invention may be provided as a game machine including storage means (WRAM 22 or cartridge 17) having stored therein the above-described game program and a program executing means (CPU core 21) which executes the game program stored in the storage means. Also, the present invention can be achieved by a program, and with the program being recorded on a recording medium for transfer, the present invention can be easily implemented in another independent computer system.

According to the first, second, and third aspects, the target image(s) moves on the display screen. The player specifies at least one target image at a desired position, thereby specifying an arbitrary position on a moving path of the target image. That is, the player has to observe the moving target image to predict the time when the target image reaches the desired position, and then has to perform an input operation just as the target image reaches that desired position. The operation skill of specifying the target image at an appropriate position, while viewing the moving image, is reflected in the game. Therefore, in the illustrative embodiments, the input operation reflects the player's operation skill, not merely the timing of the input operation. Thus, it is possible to provide an entertaining game, reflecting the player's operation skill.

Also, the position specified by the player is an arbitrary position on the moving path of the target image. Therefore, the flexibility of the input operation by the player is higher than the flexibility of a conventional operation with a physically-fixed input unit. Thus, various input operations can be performed, preventing the game from becoming monotonous and boring. Further, the location of operation by the player is not fixed, thereby varying the player's involvement in the operation.

Furthermore, according to the first and second aspects, the characteristic parameter of the game character is changed based on the positional relation between the specified coordinates on the display screen and the game character. Therefore, it is possible to provide a novel game in which the progress of the game is changed in accordance with the position specified by the player.

Still further, according to the first aspect, the game machine prompts the player to select one or more target images from the plurality of target images. At this time, the player observes the plurality of target images to predict a target image that reaches the desired position, and then selects the target image from the plurality of target images. That is, with multiple target images being displayed, a higher operation skill is required, compared with the operation skill required when a single target image is displayed. This further increases the entertainment value of the game.

Still further, according to the third embodiment, the display state of the game image is changed in accordance with the positional relation among the plurality of points represented by the specified coordinates. Therefore, while observing the positions of the plurality of moving target images, the player touches the target image that reaches an appropriate position, which provides the player with a new type of game play experience.

Also, when the movement stopping step is further performed, the movement of the target image is stopped when the player touches the target image in a timely fashion. Therefore, the player can easily tell the position at which the player touched the target image.

Furthermore, the characteristic parameter of the game character is changed when the specified coordinates represent a position on the game character image, thereby making it possible to achieve the following. The characteristic parameter of the game character is changed when the target image has been successfully specified on the game character image. This makes it possible to make the player easily and visually aware of when to touch the target image.

Still further, when the degree of variance of the characteristic parameter is changed in accordance with the decision coordinate area, including the specified coordinates, it is possible to use a simple process of specifying the decision coordinate area, including the specified coordinates, in order to increase or decrease the characteristic parameter in accordance with the positional relation between the specified coordinates and the game character.

Still further, when the time keeping process is performed, the player's input operation has to be performed before the time limit is reached, thereby better reflecting the player's operation skill.

Still further, when the number-of-inputs counting step is further performed, the number of inputs from the player is limited, thereby better reflecting the player's operation skill.

Still further, when the first changing step is performed, the size, for example, of the target image is changed in accordance with the game character, thereby varying the operation skill for each game character. For example, the degree of difficulty in the operation skill required for the player can be varied in accordance with the strength of the game character.

Still further, when the second changing step is performed, the degree of difficulty in the required operation skill can be varied in accordance with the level of the operation skill of the player.

Still further, when the character movement control step is performed, the game character, as well as the target image, is moving. This makes it more difficult for the player to specify the target image at a desired position, thereby varying the degree of difficulty in the game and providing a more entertaining game.

Still further, when the moving speed changing step is performed, the moving speed of the target image is increased when the target image passes over the specified position. Therefore, the operation skill of the player can be better reflected as the game progresses.

Still further, where the moving speed of the target image is increased when the target image is passing over a predetermined decision coordinate area, the effect in the game is greater if a target image with a higher speed is specified. Therefore, the player's operation skill can be further reflected in the progress of the game, and the degree of difficulty can be varied.

Still further, when the image display changing step is performed, the size of the target image is decreased when the target image passes over the desired position. Therefore, the player's operation skill can be further reflected in the progress of the game.

Still further, when the size of the target image is decreased when the target image passes over the predetermined decision coordinate area, the effect in the game is greater as a target image of a smaller size has been specified. Therefore, the player's operation skill can be further reflected in the progress of the game, and also the degree of game difficulty can be varied.

Still further, when target images of types with different appearances are displayed, different game effects can be provided in accordance with different target images. Therefore, the player's operation skill can be further reflected in the progress of the game. Also, the strategic aspect of the game is increased, thereby increasing an entertainment aspect of the game.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is an illustration showing an example of enemy character data 41;

FIG. 14 is an illustration showing an example of a skill information table 48 in step 16 of FIG. 12;

DESCRIPTION OF THE PREFERRED EMBODIMENTS

First Embodiment

Figure 1:
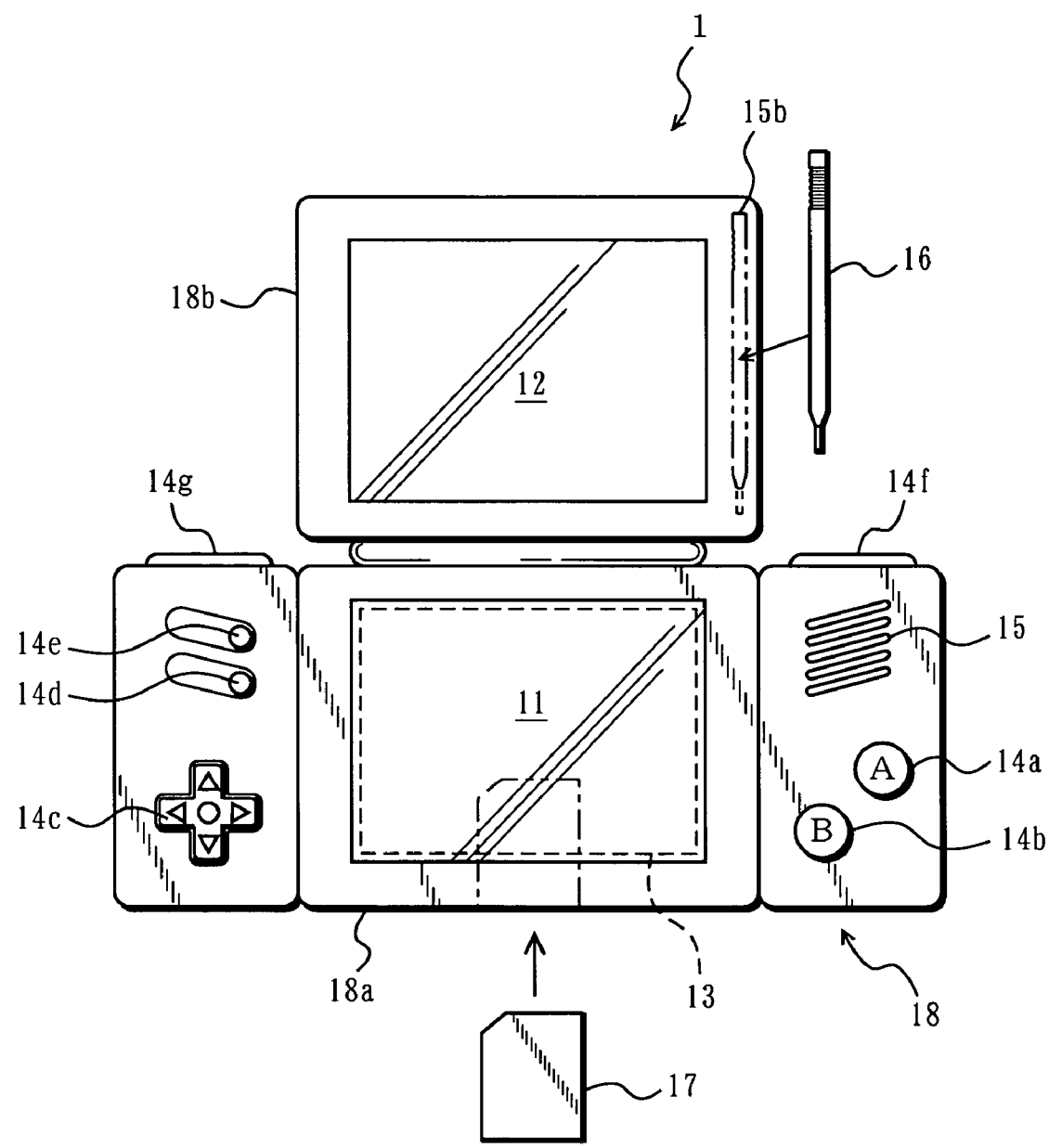
FIG. 1 is an external view of a portable game machine according to one embodiment of the illustrative embodiments.

FIG. 1 is an external view of a portable game machine according to one embodiment of the illustrative embodiments. In FIG. 1, a game machine 1 according to the present embodiment has two liquid crystal displays (hereinafter, "LCDs") 11 and 12 incorporated in a housing 18 so that these LCDs are disposed at predetermined positions. Specifically, when the first LCD 11 and the second LCD are vertically disposed, the housing 18 includes a lower housing 18a and an upper housing 18b. The upper housing 18b is rotatably supported by a part of the upper side of the lower housing 18a. The shape of the upper housing 18b viewed from the top is slightly larger than that of the second LCD 12 viewed from the top, and is formed with an opening so as to expose a display screen of the second LCD 12 on one main surface. The lower housing 18a is formed with an opening so as to expose a display screen of the first LCD 11 at approximately the center position in the horizontal direction. The shape of the lower housing 18a is longer in the horizontal direction than that of the upper housing 18b. The lower housing 18a is formed with sound holes 15a of a loudspeaker 15 on either one of right and left portions sandwiching the first LCD 11, and also an operation switch section 14 is mounted on both of the right and left portions sandwiching the first LCD 11.

The operation switch section 14 includes operation switches 14a and 14b that are mounted on the one main surface of the lower housing 18a at the right side of the first LCD 11; and a direction indicating switch 14c, a start switch 14d, and a select switch 14e that are mounted on the one main surface of the lower housing switch 14c mounted on the left side of the first LCD 11. The operation switches 14a and 14b are used to give an instruction for jumping, punching, moving a weapon or the like in an action game, for example, or to get an item, select a weapon or a command, or the like in a role playing game (RPG) or a simulation RPG. The direction indicating switch 14c is used to indicate a direction on a game screen, such as a direction a player object is to move (or a player character) operable by a player and a direction a cursor is to move. Also, as required, another operation switch may be added, or side switches 14f and 14g may be provided at the right and left of the upper surface (the upper-side surface) of the area in which the operation switch section 14 is mounted on the lower housing 18a.

Furthermore, a touch panel 13 (a dotted area in FIG. 1) is mounted on the surface of the first LCD 11. The touch panel 13 may be any one of a resistive-film type, an optical (infrared) type, and a capacitive type. When a stick 16 (or a finger) presses, strokes, or moves over the touch panel 13, the coordinate position of the stick 16 is detected for output of coordinate data.

As required, the upper housing 18b is formed with an accommodation slit 15b (a two-dotted area in FIG. 1) in the vicinity of a side surface for accommodating the stick 16 for operating the touch panel 13. The lower housing 18a is formed at a part of a side surface with a cartridge insertion portion (another two-dotted area in FIG. 1) in which a game cartridge 17 (hereinafter simply referred to as a cartridge 17) having incorporated therein a memory that stores a game program (such as ROM) is inserted. The cartridge is an information storage medium for storing a game program, and is typically implemented by a non-volatile semiconductor memory, such as a ROM or a flash memory. The cartridge insertion portion has incorporated therein a connector (refer to FIG. 2) for electrical connection with the cartridge 17. Furthermore, the lower housing 18a (or the upper housing 18b) has accommodated therein an electronic circuit board with various electronic components, such as a CPU, being mounted thereon. The information storage medium for storing a game program is not restricted to the above-stated non-volatile semiconductor memory, but may be a CD-ROM, DVD, or other optical-disk-type storage medium.

Figure 2:
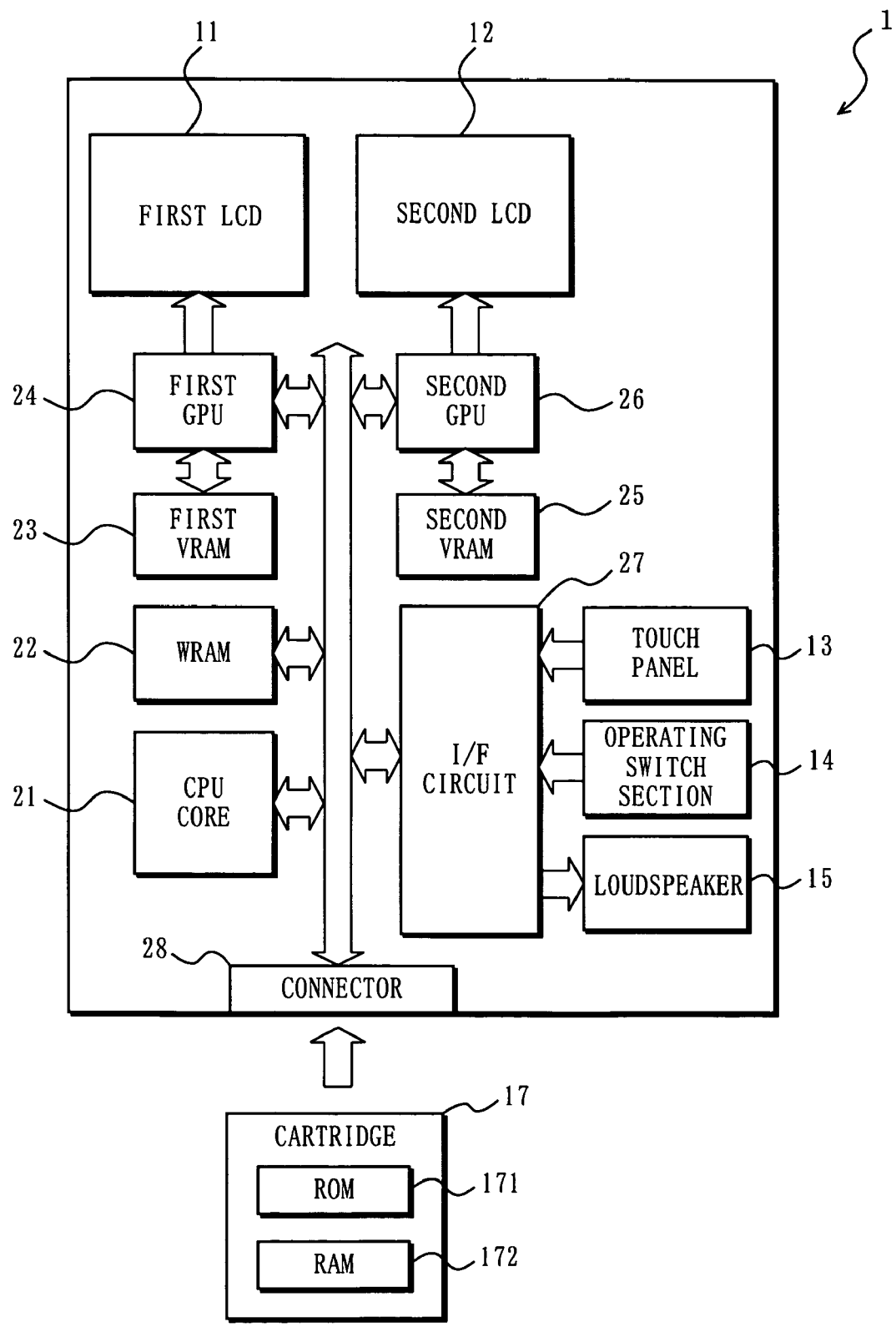
FIG. 2 is a block diagram showing the internal structure of a game machine 1.

Next, with reference to FIG. 2, the internal structure of the game machine 1 is described. FIG. 2 is a block diagram showing the internal structure of the game machine 1.

In FIG. 2, the electronic circuit board accommodated in the housing 18a has a CPU core 21 mounted thereon. The CPU core 21 is connected to a connector 28 for connection with the cartridge via a predetermined bus, and is also connected to an input/output interface (I/F) circuit 27, a first graphic processing unit (first GPU) 24, a second graphic processing unit (second GPU) 26, and a working RAM (WRAM) 22.

To the connector 28, the cartridge 17 is removably connected. As described above, the cartridge 17 is a storage medium for storing a game program and, specifically, includes a ROM 171 for storing a game program and a RAM 172 for rewritably storing backup data. The game program stored in the ROM 171 of the cartridge 17 is loaded to a WRAM 22. The game program loaded to the WRAM 22 is then executed by the CPU core 21. The WRAM 22 stores temporary data and image-generating data obtained by the CPU core 21 executing the game program.

The I/F circuit 27 is connected to the touch panel 13, the operation switch section 14, and the loudspeaker 15. The loudspeaker 15 is disposed at a position inside of the above-described sound holes 15.

The first GPU 24 is connected to a first video RAM (hereinafter, "VRAM") 23, while the second GPU 26 is connected to a second VRAM 25. In response to an instruction from the CPU core 21, the first GPU 24 generates a first game image based on data for generating an image stored in the WRAM 22. The generated first game image is then rendered by the first GPU 24 to the first VRAM 23. On the other hand, in response to an instruction from the CPU core 21, the second GPU 26 generates a second game image based on data for generating an image stored in the WRAM 22. The generated second game image is then rendered by the second GPU to the second VRAM 25.

The first VRAM 23 is connected to the first LCD 11, while the second VRAM 25 is connected to the second LCD 12. In response to an instruction from the CPU core 21, the first GPU 24 outputs the first game image rendered to the first VRAM 23 to the first LCD 11. The first LCD 11 then displays the first game image output from the first GPU 24. On the other hand, in response to an instruction from the CPU core 21, the second GPU 26 outputs the second game image rendered to the second VRAM 25 to the second LCD 12. The second LCD 12 then displays the second game image output from the second GPU 26.

Hereinafter, a game process to be executed on the game machine by the game program stored in the cartridge 17 is described. Note that, in the present invention, only the first LCD 11 with its display screen being covered with a touch panel is taken as a display unit. As such, the game machine according to the present invention may be configured not to include the second LCD 12. In other words, the game machine according to the present invention can be achieved by a game machine, a PDA, or the like that is configured to include a single display unit.

Figure 3A:
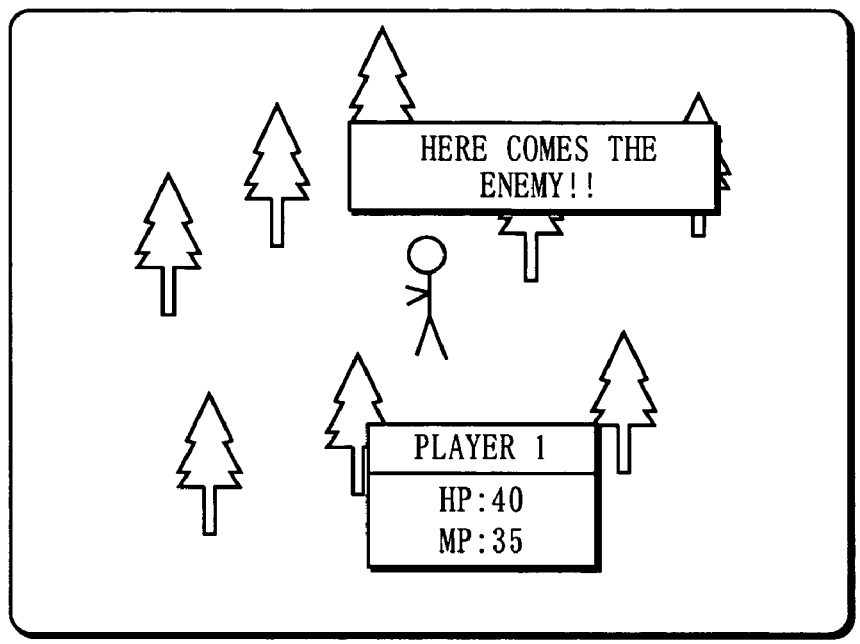
FIGS. 3A and 3B are illustrations showing examples of a game image displayed on a display screen of a first LCD 11.
Figure 3B:
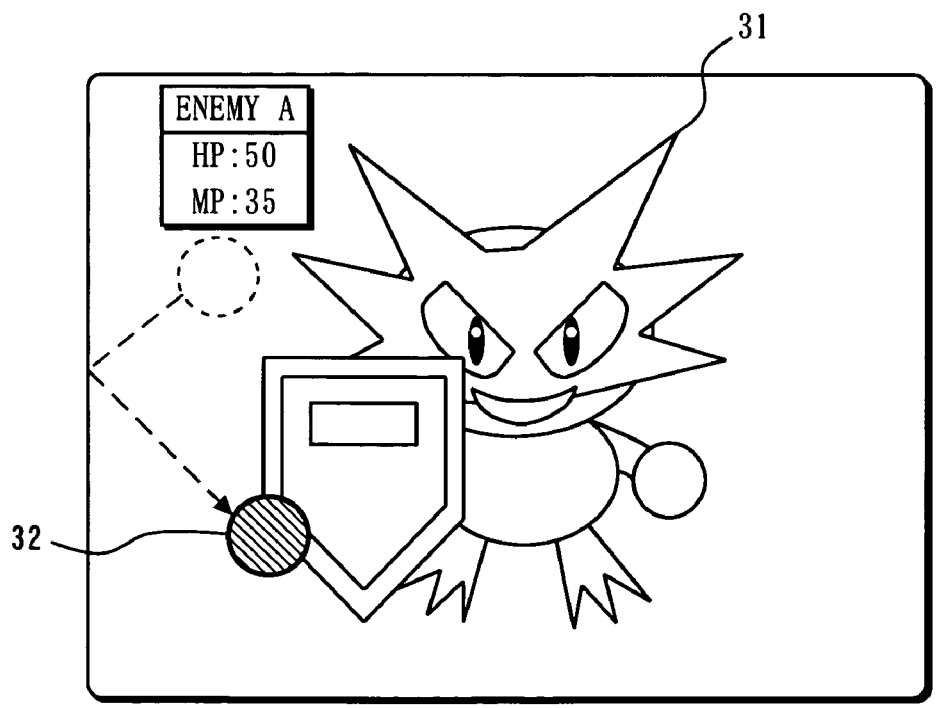

First, a general outline of a game to be played on the game machine 1 is described with reference to FIGS. 3A through 9B. FIGS. 3A and 3B are illustration showing one example of a game image displayed on the display screen of the first LCD 11. Any type of game can be played on the game machine according to the illustrative embodiments. In the first embodiment, a role playing game as shown in FIGS. 3A and 3B is described as an example. This role playing game includes a scene in which a player character operated by the player is traveling on a game map (FIG. 3A) and a scene in which the player character battles against an enemy character (FIG. 3B). In the traveling scene, when predetermined conditions under which the player character meets an enemy character are satisfied, "Here comes the enemy!!" is displayed on the display screen, as shown in FIG. 3A. Then, the game image is switched to a battle scheme as shown in FIG. 3B. Note that, for the game machine having two display units as shown in FIG. 1, the traveling scene may be displayed on the second LCD 12, while the battle scene may be displayed on the first LCD 11.

In the battle scene as shown in FIG. 3B, the game image including an enemy character 31 is displayed on display screen of the first LCD 11. This game image includes a target image 32 moving on the display screen. The target image 32 is an image to which an instruction from the player is targeted. That is, in order to attack the enemy character, the player performs an input operation, which is a game operation, on the touch panel 13 by touching his or her finger on the target image 32. In FIG. 3B, a dotted circle and a dotted line represent the movement of the target image 32, and are not actually displayed on the game image.

Also in the display screen illustrated in FIG. 3B, characteristic parameters of the enemy character are displayed. The characteristic parameters are values indicative of characteristics of a game character appearing in the game. Specifically, hit points (HP) and magic points (MG) of the enemy character are displayed on the first LCD 11 as the characteristic parameters. After the game image is switched to the battle scheme, the player character and the enemy character take turns attacking each other to proceed with the battle.

Figure 4A:
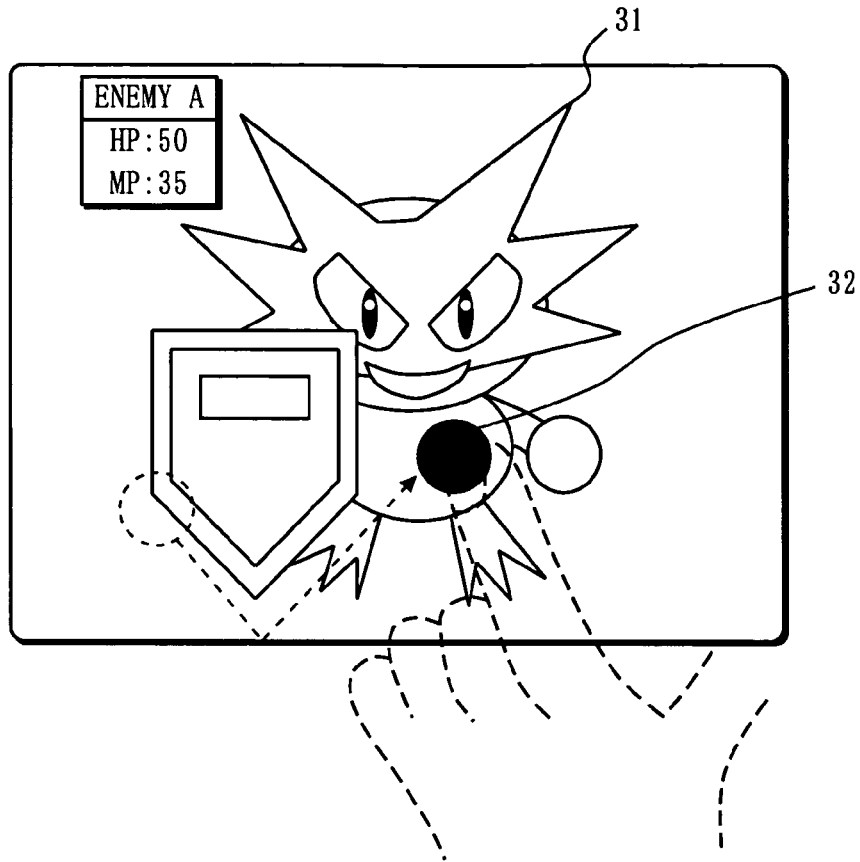
FIGS. 4A and 4B are illustrations showing examples of a game image when a player performs an attacking operation.

When the player-character's attacking turn comes during the battle, the player operates a game operation (attacking operation) for attacking the enemy character. FIG. 4A is an illustration showing one example of a game image when the player performs an attacking operation. As shown in FIG. 4A, the player performs a touch-panel input to specify the target image 32. That is, the player performs an input by touching the touch panel 13 with his or her finger at the position where the target image 32 is displayed. If the player has successfully specified the target image 32, an attack against the enemy character is performed. On the other hand, if the player has not successfully specified the target image 32, no attack is performed.

Figure 4B:
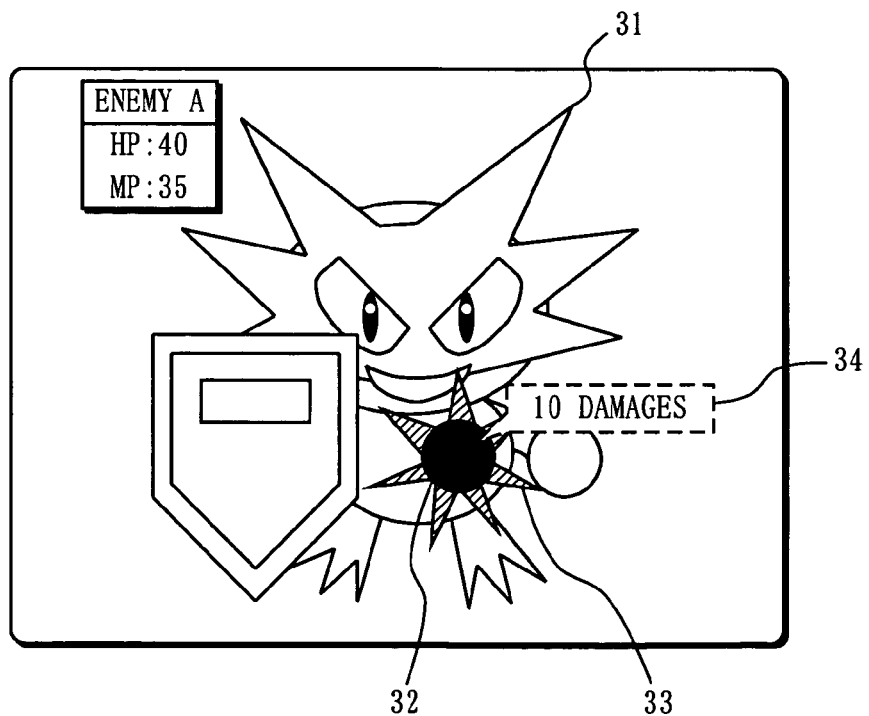

FIG. 4B is an illustration showing one example of a game image after the player performs an attacking operation. Specifically, FIG. 4B illustrates a game image when the player has successfully specified the target image 32. In this case, the game machine 1 performs the following game process as a process of the player character attacking the enemy character. That is, an attack effect image 33, indicative of an attack by the player character against the enemy character, is displayed. Also, a damage image 34, indicative of the amount of damage the enemy character suffers from the attack, is displayed. The damage image 34 shown in FIG. 4B indicates that the enemy character suffers the amount of damage of 10. Furthermore, the game machine 1 performs a process of changing the HP of the enemy character 31. In the example of FIG. 4B, the game machine 1 subtracts 10 points from the HP of the enemy character 31. As a result, in a display on the upper-left of the display screen indicative of the characteristic parameters of the enemy character, 10 points are subtracted from the original HP of the enemy character 31 (represented by "ENEMY A" in FIG. 4B).

The target image 32 may move in accordance with a rule (movement pattern) set in advance in the game machine 1, or may move in a random manner. In the first embodiment, the target image 32 moves so as to change its moving direction at the edge of the display screen. In another embodiment, the target image 32 may move so as to change its moving direction at time predetermined intervals or at intervals determined in a random manner. Also, the direction-changing rule is arbitrary. For example, the rule may be such that the moving direction is changed by a predetermined angle or by an angle determined in a random manner.

Also, in the first embodiment, when the player has successfully specified the target image 32, the state of display of the target image 32 is changed. Specifically, the color, shape, or size of the target image 32 is changed. Here, the state of display of the target image 32 before change is represented by a hatched circle (FIG. 3B), while the state of display of the target image 32 after change is represented by a black circle (FIG. 4A). With the state of display of the target image 32 being changed, the player can visually recognize that the player has successfully specified the target image 32. That is, the player can easily recognize that the player has successfully specified the target image 32.

Still further, in the first embodiment, the damage given to the enemy character is varied in accordance with the position of the target image 32 when specified by the player. That is, the game machine 1 varies the HP of the enemy character in accordance with the relation between the position of the target image 32 when specified by the player and the position of the enemy character. In the first embodiment, the damage given to the enemy character is varied depending on the position at which the target image 32 is located when specified by the player, that is, any one of a position of an eye of the enemy character, a position of a shield held by the enemy character, and positions of others (normal positions). For example, in FIG. 4B, the player specifies a normal position. In this case, the damage given to the enemy character is "10".

Figure 5A:
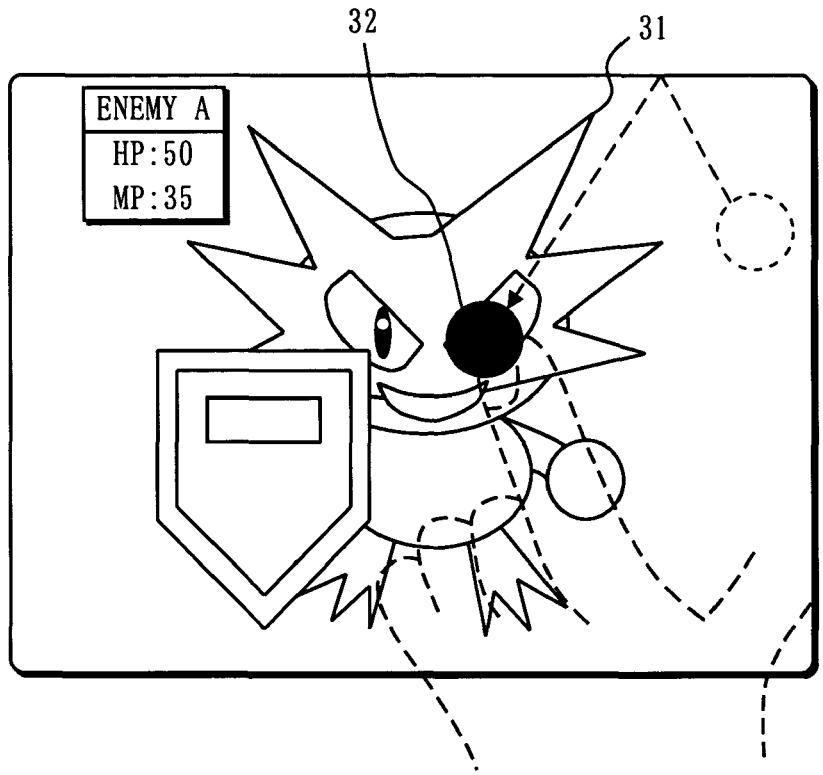
FIGS. 5A and 5B are illustrations showing examples of a game image when the player performs an attacking operation on an eye of an enemy character.
Figure 5B:
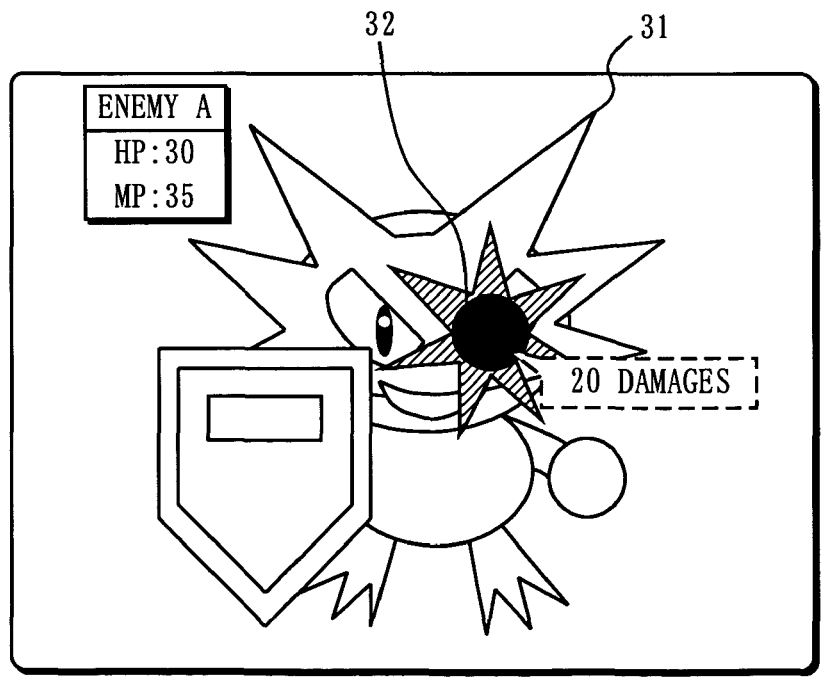

FIG. 5A is an illustration showing one example of a game image when the player performs an attacking operation on an eye of the enemy character. In the first embodiment, the target image 32 can two-dimensionally move on the display screen, and therefore the player can freely specify any position on the display screen. Thus, for example, as shown in FIG. 5A, the player can also specify the position of an eye of the enemy character, that is, can stop the movement of the target image 32 at the position of the eye of the enemy character. FIG. 5B is an illustration showing one example of a game image after the player performs the attacking operation at the position of the eye of the enemy character. As shown in FIG. 5B, when the player specifies the position of the eye of the enemy character, the damage given to the enemy character is "20". That is, the position of the eye is set as a weak position of the enemy character. The damage given to the enemy character when the weak position is specified by the player is larger than that when a normal position is specified by the player.

Figure 6A:
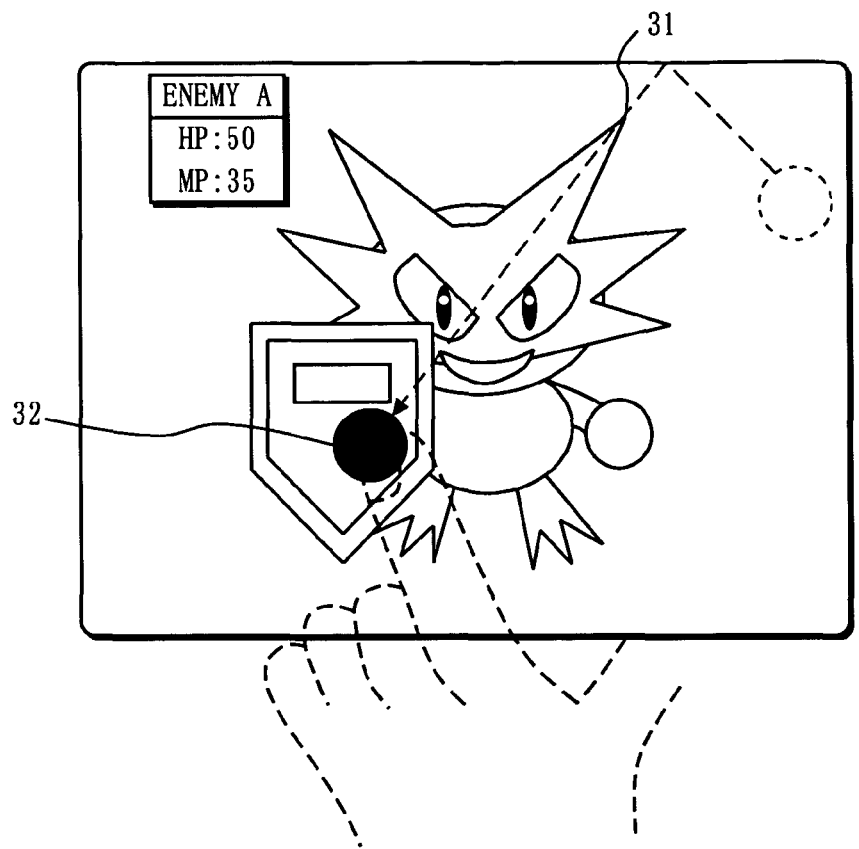
FIGS. 6A and 6B are illustrations showing examples of a game image when the player performs an attacking operation on a shield held by the enemy character.
Figure 6B:
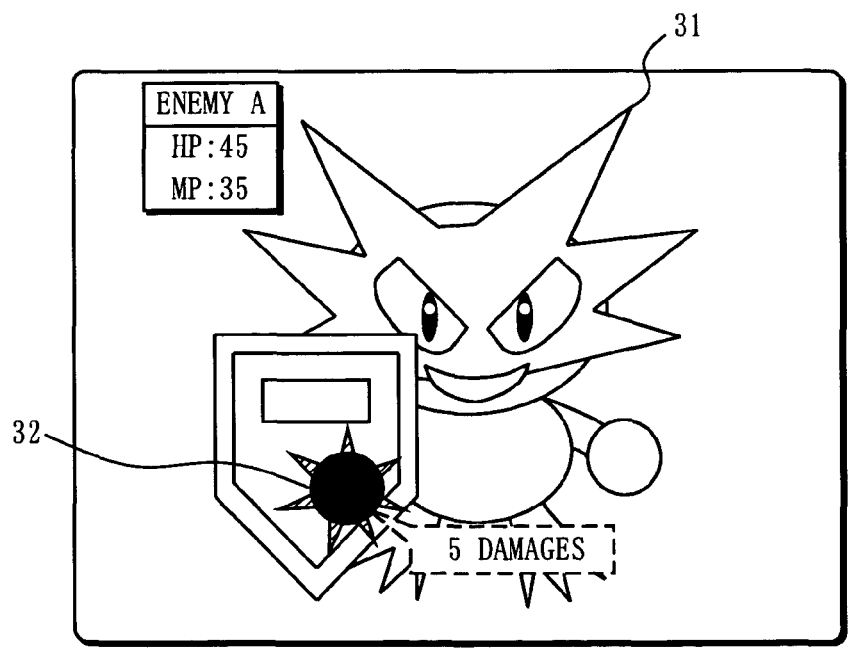

FIG. 6A is an illustration showing a game image when the player performs an attacking operation at the position of the shield held by the enemy character. FIG. 6B is an illustration showing a game image after the player performs an attacking operation at the position of the shield held by the enemy character. As shown in FIG. 6B, when the position of the shield held by the enemy character is specified by the player, the damage given to the enemy character is "5". The position of the shield held by the character is set as a position whose defensive power is higher than those of the normal positions. Therefore, the damage given to the enemy character when such a position with a high defensive power is smaller than the damage when any normal position is specified by the player.

Figure 7A:
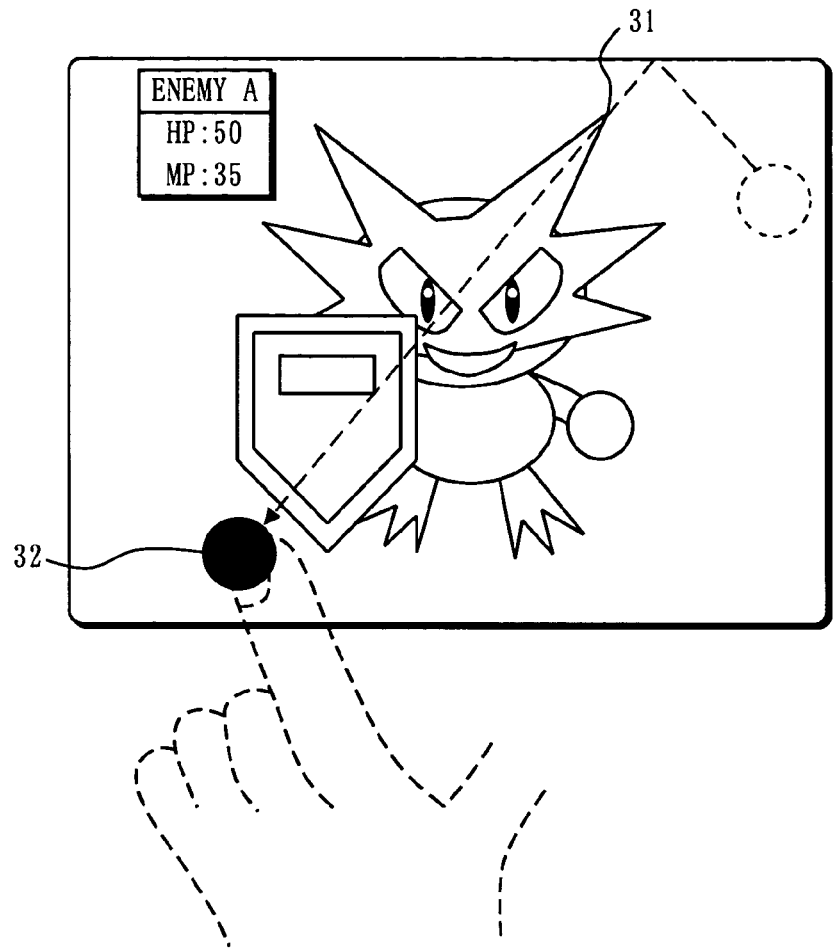
FIGS. 7A and 7B are illustrations showing examples of a game image when the player performs an attacking operation on a part other than the image of the enemy character.
Figure 7B:
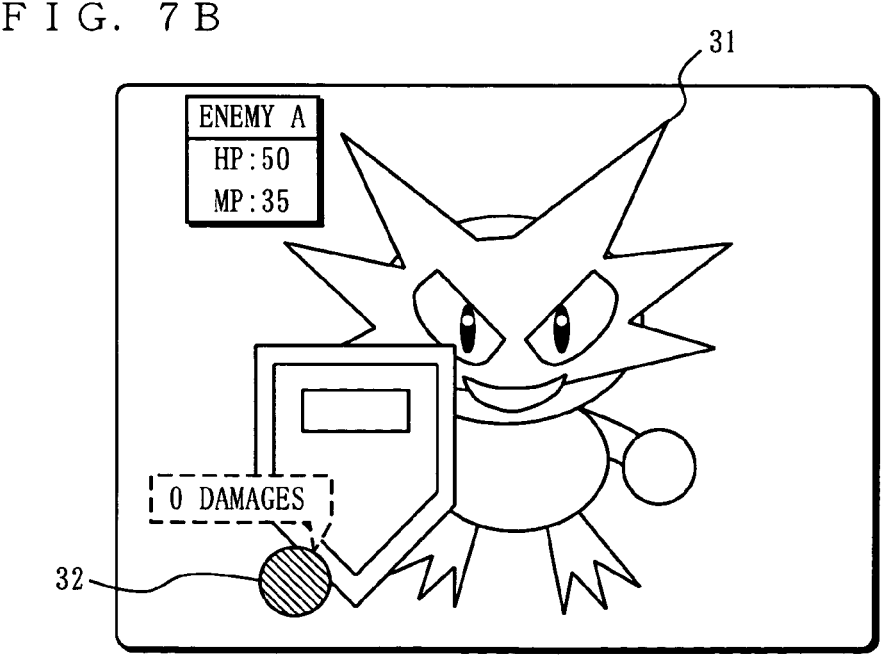

FIG. 7A is an illustration showing one example of a game image when the player performs an attacking operation at a position other than the position of the image of the enemy character. In the first embodiment, the game machine 1 moves the target image 32 so that it passes over the image of the enemy character 31. Therefore, the target image 32 is moved not only over the image of the enemy character 31 but also over images other than the image of the enemy character 31. That is, as shown in FIG. 7A, the player can also specify a position away from the enemy character 31. FIG. 7B is an illustration showing one example of a game image after the player performs an attacking operation at a position other than the position of the image of the enemy character. As shown in FIG. 7B, when the player specifies a position away from the enemy character 31, no damage is given to the enemy character 31.

As described above with reference to FIGS. 4A through 7B, in the first embodiment, the HP of the enemy character is varied in accordance with the relation between the position of the target image 32 when specified by the player and the position of the enemy character 31. Therefore, the player performs an input operation with attention not only to the time when the target image 32 is specified but also to the position of the target image 32 when specified. That is, in the game according to the illustrative embodiments, an operation skill of specifying the target image at a suitable position while viewing the moving images reflects on the game. Also, in the first embodiment, the damage given to the enemy character is varied depending on the position of the target image 32 when specified by the player 32. Therefore, the player can also play the game with the aim of finding weak points in the enemy character.

Figure 8:
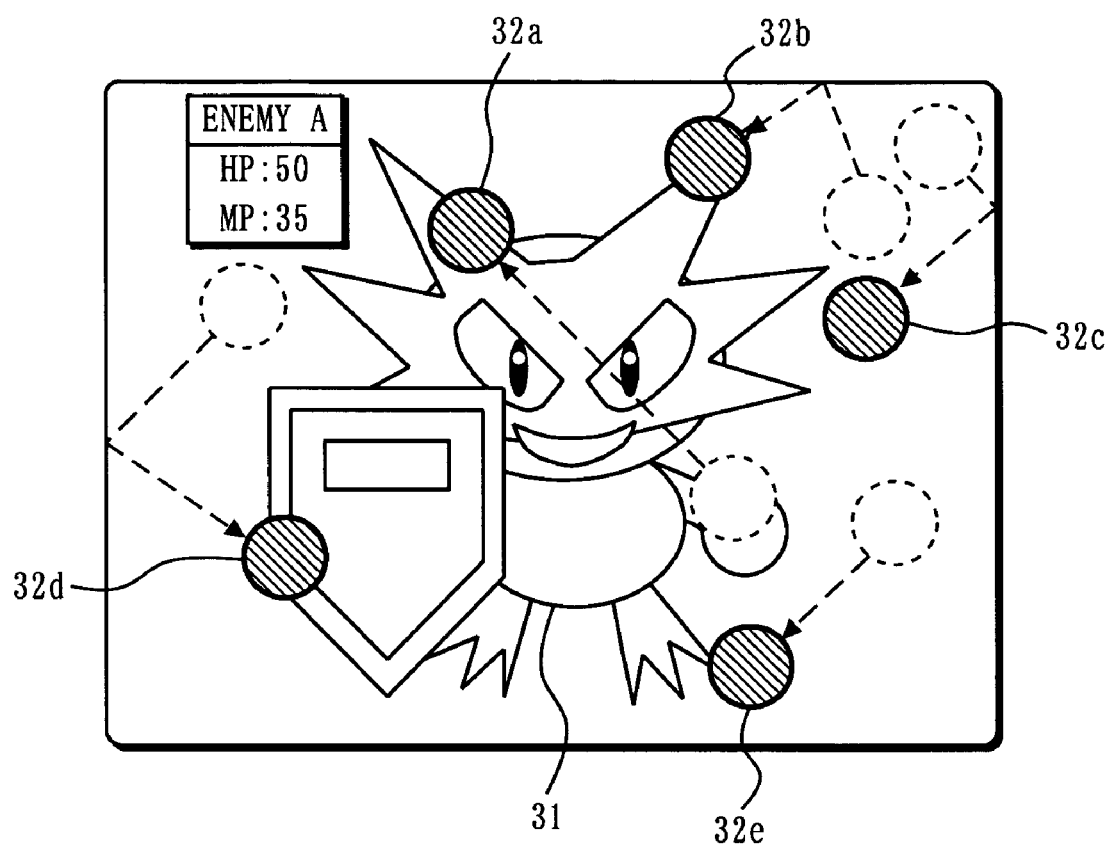
FIG. 8 is an illustration showing one example of a game image including a plurality of target images.

In FIGS. 4A through 7B, one target image 32 is present. Alternatively, a plurality of target images 32 may be present. FIG. 8 is an illustration showing one example of a game image including a plurality of target images. In FIG. 8, five target images 32a, 32b, 32c, 32d, and 32e are displayed on the display screen of the first LCD 11. In the first embodiment, each of the target images 32a through 32e moves with its moving direction being changed at the edge of the display screen. In another embodiment, each of the target images 32a through 32e may move in accordance with each different rule, or some of the target images 32a through 32e may move in a random manner.

Figure 9A:
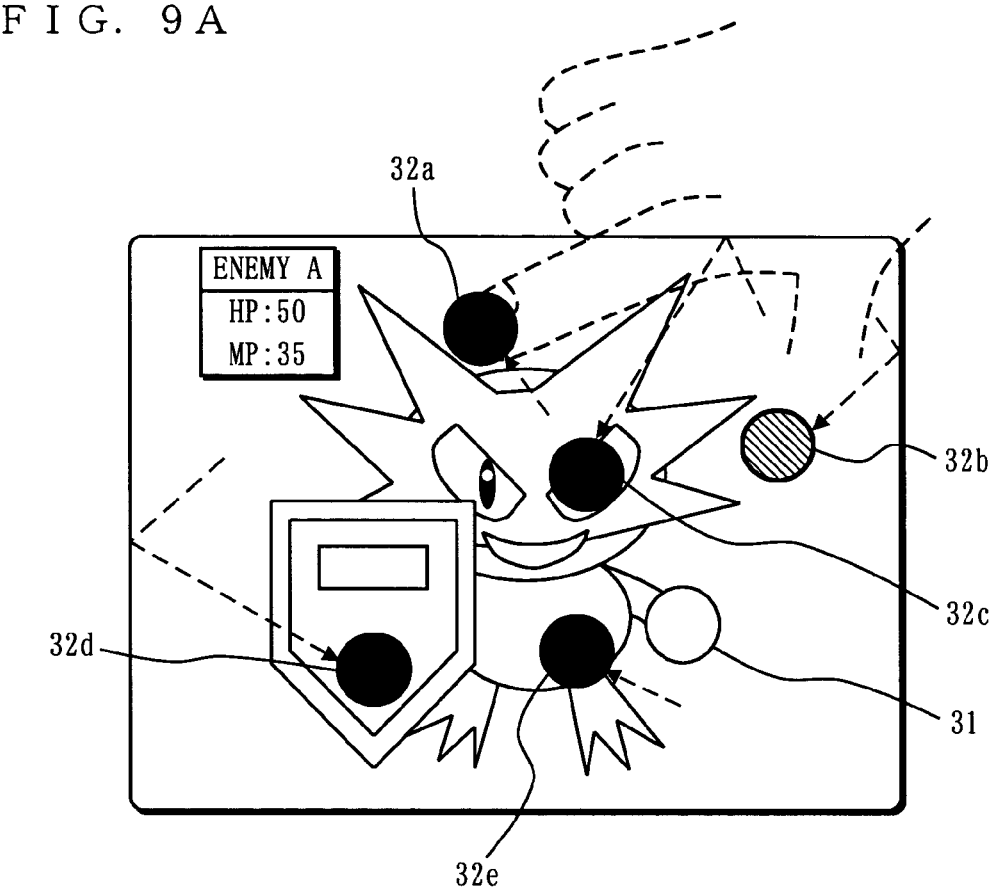
FIGS. 9A and 9B are illustrations showing examples of a game image when the player performs an attacking operation on a plurality of target images.

FIG. 9A is an illustration showing one example of a game image when the player performs an attacking operation with a plurality of target images. With such a plurality of target images as shown in FIG. 9A, the player can specify one or more target images with one attacking operation. Also, in the first embodiment, the game machine 1 measures an elapsed time from the time when each of the target images 32a through 32e starts moving, and receives an input from the player to the touch panel until the elapsed time exceeds a predetermined limit time. That is, the player has to specify any of the target images 32 within a period from the time when each of the target images 32a through 32e starts moving to the limit time. In FIG. 9A, the player has specified four target images (target images 32a, 32c, 32d, and 32e).

Figure 9B:
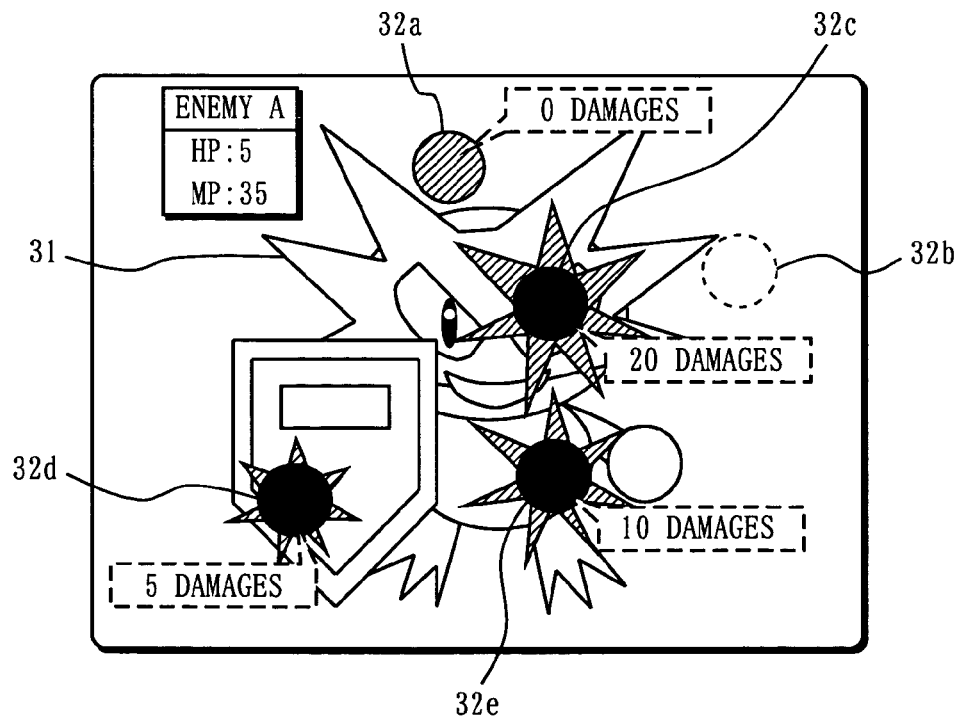

FIG. 9B is an illustration showing one example of a game image after the player performs an attacking operation with a plurality of target images. With such a plurality of target images, the game machine 1 calculates a damage for each of the target images specified by the player. A total damage eventually given to the enemy character is calculated as a sum of damages calculated for the target images 32. For example, in FIG. 9B, the damage given by the player specifying the target image 32c is calculated as "20", the damage given by the player specifying the target image 32d is calculated as "5", and the damage given by the player specifying the target image 32e is calculated as "10". Here, the target image 32a is not specified on the enemy character 31, and therefore the damage given by the player specifying the target image 32a is calculated as "0". As a result, a total damage given to the enemy character 31 is 20+5+10+0=35. Also, the target image 32b was not specified within the limit time, and therefore no damage is calculated for the target image 32b.

As described above with reference to FIGS. 9A and 9B, with a plurality of target images being simultaneously displayed, the player can select one or more target images for attack from among those plurality of target images. The player has to decide which target image passes over the position to be attacked (in the example of FIG. 4A, the position of the eye of the enemy character 31). Therefore, a higher operation skill is required compared with the case where a single target image is displayed. Therefore, with such a plurality of target images, an entertainment aspect of the game can be further increased.

Figure 10:
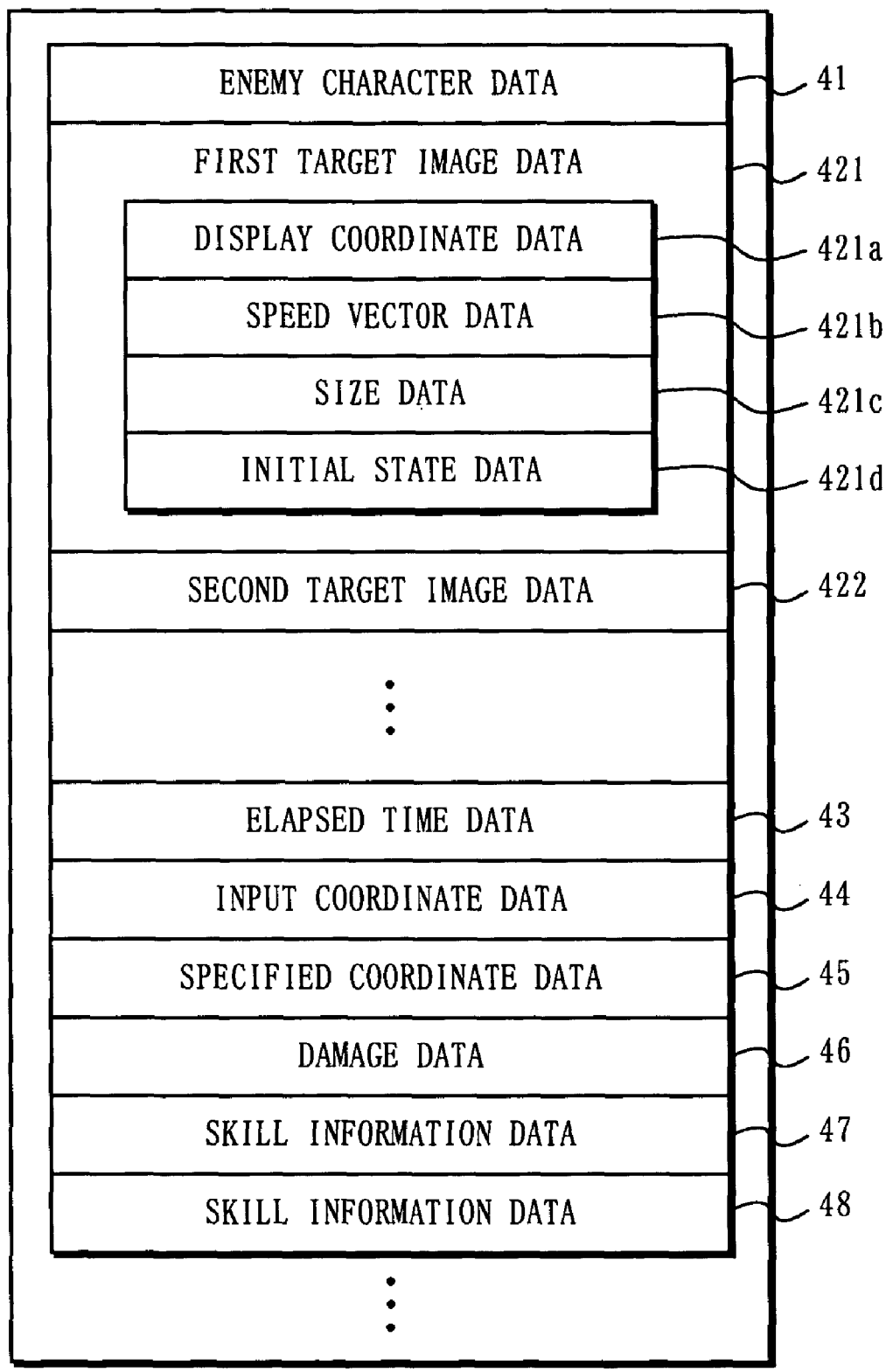
FIG. 10 is an illustration showing a memory map of a WRAM 22 of the game machine 1.

Next, the game process performed by the game machine 1 is described in detail. First, data stored in the WRAM 22 at the time of the game process is described. FIG. 10 is an illustration showing a memory map of the WRAM 22 of the game machine 1. As shown in FIG. 10, at the time of the game process, enemy character data 41 is stored in the WRAM 22. In the enemy character data 41, each enemy character is associated with its related information. With reference to FIG. 11, details of the enemy character data 41 are described below.

FIG. 11 is an illustration showing one example of the enemy character data 41. As shown in FIG. 11, in the enemy character data 41, each enemy character is associated with its HP, MP, first to third damage areas, and target image information. The HP represents hit points of the enemy character at the start of the battle with the player character. As the battle progresses, the HP of the enemy character data 41 are decreased and, when the HP become 0, the enemy character is assumed to lose the battle. The MP represents magic points of the enemy character at the start of the battle with the player character.

Also, in FIG. 11, each of the first through third damage areas is an area obtained by dividing an area where the image of the enemy character is displayed on the display screen of the first LCD 11. That is, in the area where the image of the enemy character is displayed, a plurality of damage areas (here, three damage areas) are defined in association with the enemy character. For example, the area where the image of the enemy character is displayed is divided into three damage areas, first through third damage areas. In the second damage area, the eye(s) of the enemy character is displayed. In the third damage area, the shield held by the enemy character A is displayed. In the first damage area, parts (normal parts) other than the eye(s) and the shield are displayed. Note that the enemy character A shown in FIG. 11 is the enemy character 31 shown in FIG. 3B. Also, the damage areas are represented by coordinates on the display screen. In the first embodiment, the damage given to the enemy character is varied depending on which damage area includes the position specified by the player on the touch panel 13. Here, the first damage area is an area where the enemy character is given an amount of damage equal to a reference amount of damage. The second damage area is an area where the enemy character is given an amount of damage twice as large as the reference amount of damage. The third damage area is an area where the enemy character is given an amount of damage half as much as the reference amount of damage. Also, the reference amount of damage is an amount of damage determined depending on the attack power of the player character calculated with a predetermined scheme.

Furthermore, in FIG. 11, the target image information indicates a size of the target image displayed when the enemy character is displayed on the screen. Here, the target image information is represented as a scaling factor with respect to a predetermined reference value. In FIG. 11, when the enemy character A is displayed on the screen, the size of the target image has a value that is equal to the reference value. Also, when the enemy character B is displayed on the screen, the size of the target image has a value that is twice as large as the reference value. As such, in the first embodiment, the size of the target image is varied depending on the type of the enemy character. In another embodiment, the moving speed of the target image or the moving pattern may be varied.

Returning to the description of FIG. 10, the WRAM 22 also has target image data stored therein. Here, pieces of target image data are stored in the WRAM 22 as many as the number of target images to be simultaneously displayed. The target image data indicates information regarding the display or movement of the target image. Note that only first target image data 421 and second target image data 422 are shown in FIG. 10. The first target image data 421 includes display coordinate data 421a, speed vector data 421b, size data 421c, and initial state data 421d. The display coordinate data 421a indicates a position (display position) of the target image on the display screen. The display position is represented by coordinate values on the display screen. The speed vector data 421b indicates a vector representing the moving speed of the target image and the moving direction. The size data 421c indicates the size of the target image. The initial state data 421d indicates a display position, moving speed, moving direction, and size of the target image at the start of the battle scene, as well as color and design of the target image. Furthermore, although only the first target image data 421 is shown in detail in FIG. 10, other pieces of target image data each have a structure similar to that of the first target image data 421.

The WRAM 22 also stores elapsed time data 43, input coordinate data 44, specified coordinate data 45, and damage data 46. The elapsed time data 43 indicates a time elapsed from the start of movement of the target image(s) in a battle scene. The input coordinate data 44 indicates a position on the display screen specified by the player via the touch panel 13. The specified coordinate data 45 indicates a position on the display screen of at least one target image specified by the player. The input coordinate data 44 and the specified coordinate data 45 are represented by coordinate values on the display screen. Also, coordinates indicative of one or more positions specified by the player at one attacking operation are all stored as the specified coordinate data 45 in the WRAM 22. That is, when plural target images are specified at one attacking operation, specified coordinate data 45 indicative of a plurality of coordinates is stored in the WRAM 22. The damage data 46 is used to calculate a total damage given to the enemy character by the player's attacking operation. When the enemy character receives damage from the plurality of target images specified at one attacking operation, a plurality of pieces of damage data 46 are stored in the WRAM 22.

The WRAM 22 further stores skill information data 47 and skill information table 48. The skill information data 47 indicates information (skill information) serving as an index indicative of an operation skill of the player. In the first embodiment, the skill information indicates the number of times the player has successfully specified the target image at one attacking operation. Alternatively, the skill information may indicate a distance between a position specified by the player and a display position of the target image. Also, the skill information may indicate a ratio of the number of times the player has successfully specified the target image with respect to the number of inputs provided onto the touch panel 13 within the limit time. In the first embodiment, the game machine 1 changes the moving speed of the target image based on the skill information. The skill information table 48 is used to perform a process of changing the moving speed of the target image (refer to FIG. 14 that will be described further below).

In addition to the data shown in FIG. 10, the WRAM 22 further stores the game program read from the cartridge 17, game image data (such as image data of the enemy character and the target image(s)) and various data for use in a game process (for example, the HP and MP of the player character).

Figure 12:
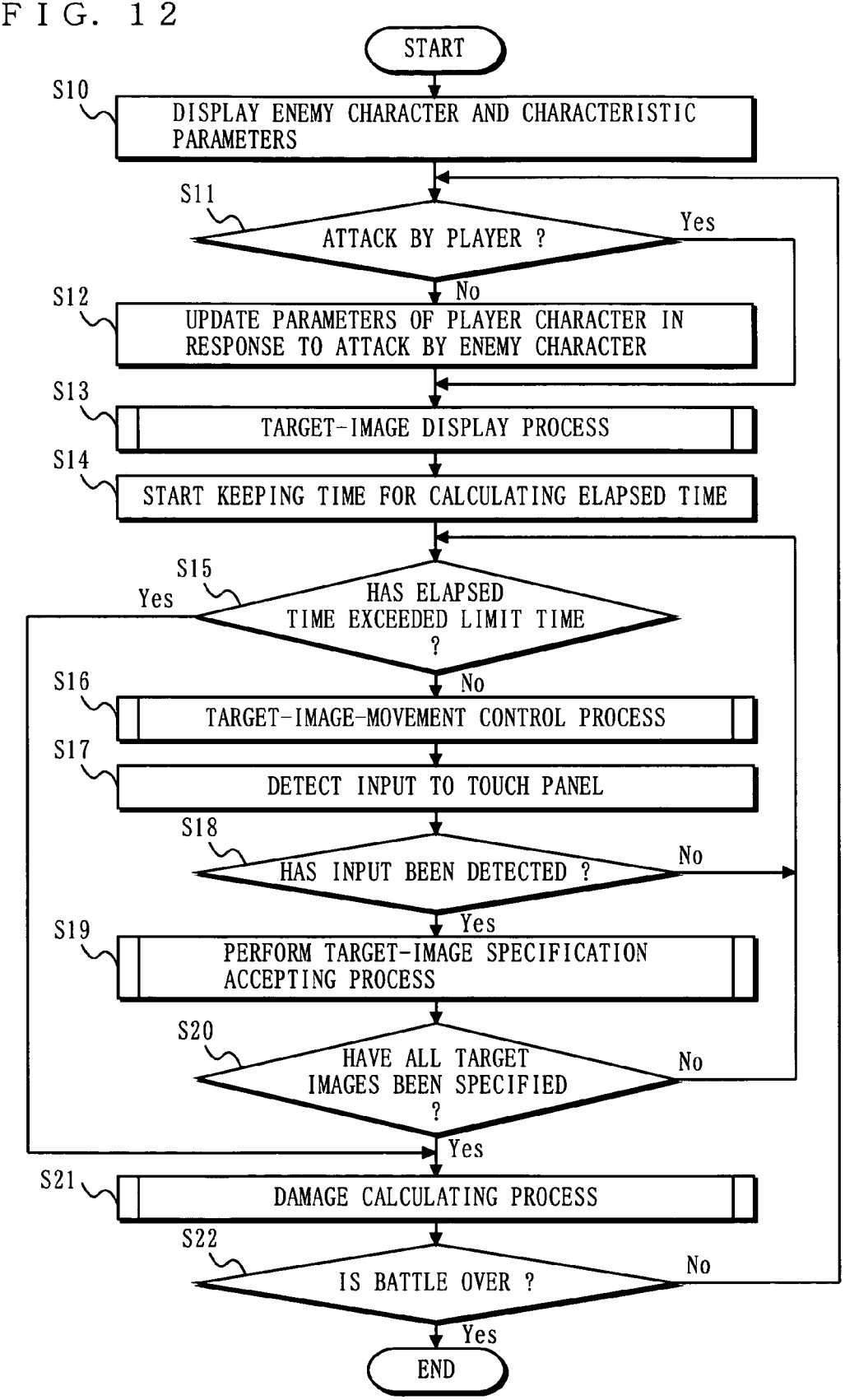
FIG. 12 is a flowchart showing a flow of a game process performed on the game machine 1.

Next, a flow of the game process performed in the game machine 1 is described with reference to FIGS. 12 through 17. FIG. 12 is a flowchart showing a flow of a game process to be performed in the game machine 1. When the game machine 1 is powered on, the CPU core 21 of the game machine 1 executes a boot program stored in a boot ROM not shown to initialize the units including the WRAM 22. Then, the game program stored in the cartridge 17 is read in the WRAM 22, thereby starting execution of the game program. As a result the game is started, with a game image being displayed on the first LCD 11 through the first GPU 24. The flowchart shown in FIG. 12 represents the game process after the game image is switched to a battle scene. That is, when a battle between the player character and an enemy character starts during the game after being started, the process shown in the flowchart of FIG. 12 is started. Note that, in the present embodiment, a game process in states other than the battle scene is not directly related to the present invention, and is therefore not described herein.

In FIG. 12, in step 10 (in the drawings, "step" is simply denoted as "S"), the image and the characteristic parameters of the enemy character are displayed on the display screen of the first LCD 11 (refer to FIG. 3B). The HP and the MP are displayed, as the characteristic parameters of the enemy character. Specifically, the CPU core 21 reads the HP and the MP of the enemy character for display from the enemy character data 41 in the WRAM 22, and then causes the read HP and MP to be displayed as the characteristic parameters on the display screen of the first LCD 11.

After step 10, it is determined in step 11 whether the player-character's attacking turn has come. The attacking turn is determined in accordance with a predetermined rule, which may be arbitrary. Here, it is assumed that the player-character's attacking turn and the enemy character's attacking turn come alternately. If it is determined in step 11 that the player-character's attacking turn has not yet come, a process in step 12 is performed. That is, in step 12, an attack by the enemy character against the player character is performed. Specifically, in response to the attack by the enemy character, the characteristic parameters (HP and MP) of the player character are varied. That is, the characteristic parameters of the player character stored in the WRAM 22 are updated. After the process in step 12 is completed, a process in step 13 is performed.

On the other hand, if it is determined in step 11 that the player-character's attacking turn has come, an attack by the player character against the enemy character is performed in steps 13 through 21. First in step 13, a target image displaying process is performed. In this target image displaying process, the initial display position, moving speed, moving direction, and size of the target image are determined for display on the display screen. Hereinafter, the target image displaying process is described with reference to FIG. 13.

Figure 13:
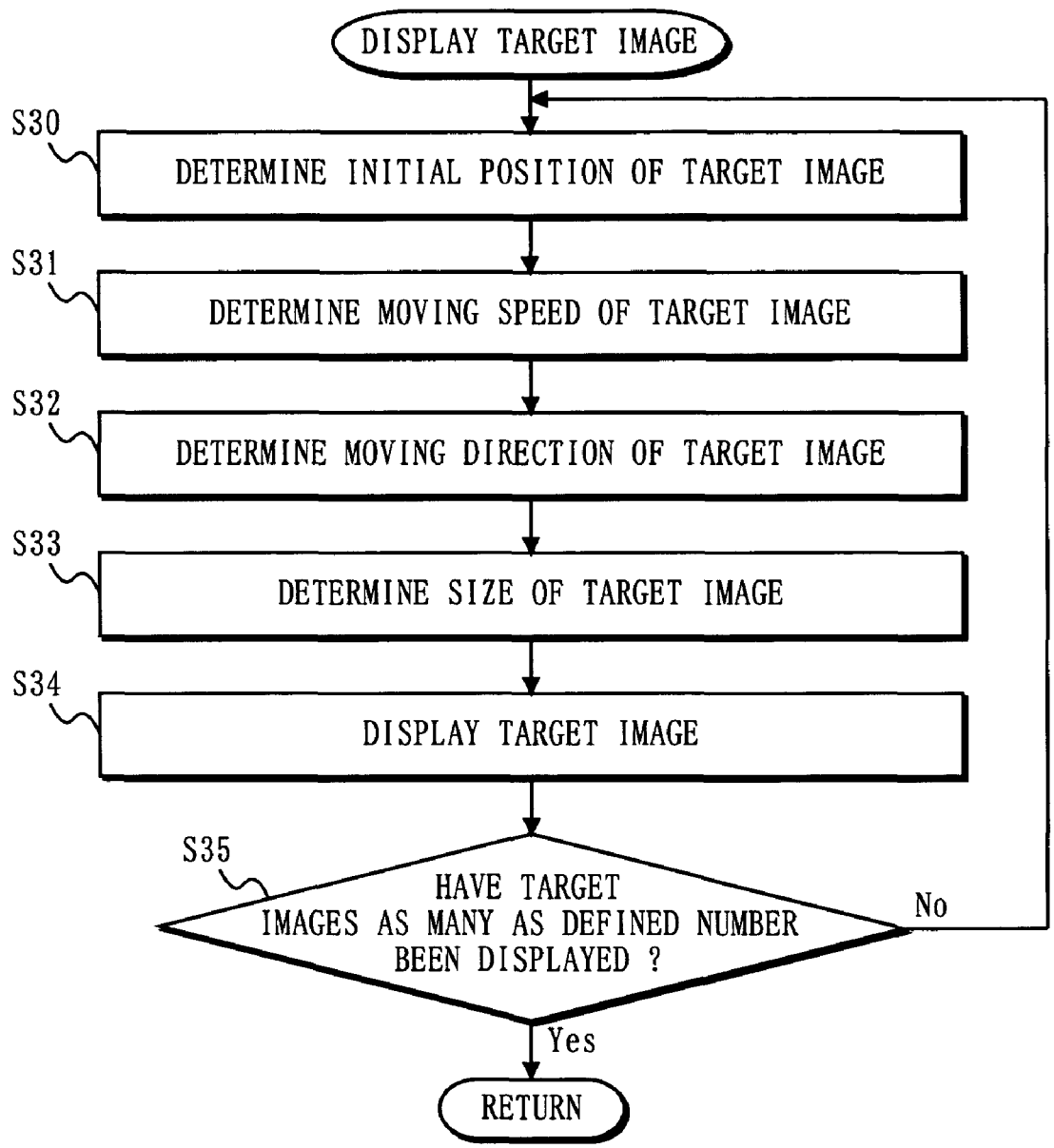
FIG. 13 is a flow chart showing a detailed flow of a process in step 13 of FIG. 12.

FIG. 13 is a flowchart showing a detailed flow of a process in step 13. In the target image displaying process, first in step 30, the initial position of the target image is determined. Specifically, the CPU core 21 reads the initial state data 421*d* included in the target image data (here, the target image data is assumed to be the first target image data 421) stored in the WRAM 22. Then, in step 31, the moving speed of the target image is determined. This moving speed is determined by using a speed indicated by the initial state data 421*d*, and the above-described skill information data 47 and skill information table 48 (refer to FIG. 10). With reference to FIG. 14, a scheme of determining a moving speed of the target image is described below.

In step 31, the CPU core 21 first determines the moving speed indicated by the initial state data 421*d* as a reference speed. Next, the reference speed is adjusted based on the skill information data 47 and the skill information table 48, thereby determining the moving speed of the target image. FIG. 14 is an illustration showing one example of the skill information table 48 stored in the WRAM 22. The skill information table 48 is a table in which the skill information is associated with speed adjusting information. Here, the skill information is information indicated by the skill information data stored in the WRAM 22 in step 56, which will be described further below. Also, the speed adjusting information is information indicating a magnification applied for adjusting the reference speed. In order to adjust the reference speed, the CPU core 21 refers to the skill information table 48 to determine a magnification corresponding to the number of times the player has successfully specified the target image indicated by the skill information data 47. For example, in FIG. 14, when the skill information data 47 indicates 4, 2× is determined as the magnification. That is, a speed obtained by multiplying the reference speed by 2 is determined as the moving speed of the target image.

In the first embodiment, the skill information is associated with the speed adjusting information in the skill information table 48. In another embodiment, the skill information may be associated with the size of the target image. With this, the size of the target image can be varied in accordance with the player's skill. Also, in still another embodiment, the skill information may be associated with the number of target images simultaneously displayed on the display screen or the moving pattern of the target image(s).

Returning to the description of FIG. 13, in step 32, the moving direction indicated by the initial state data 421*d* is determined as the moving direction of the target image. In the next step 33, the size of the target image is determined by referring to the target image information (refer to FIG. 11) included in the enemy character data 41 in the WRAM 22. In the example of FIG. 11, when the enemy character B is to be displayed on the display screen the size of the target image is determined as having a value obtained by multiplying the reference value by 2. Note that the reference value is predetermined in the game machine. In the next step 34, the target image is displayed at the position determined in step 30. Through steps 30 to 34, one target image is displayed.

After step 34, in step 35, it is determined whether the target images as many as a defined number have been displayed. In the first embodiment, the defined number is determined in advance by the game program. In another embodiment, the defined number may be varied depending on the type of the enemy character, or may be set by the player directly (such as directly designating a number) or indirectly (such as setting the number depending on the held items). If it is determined in step 35 that as many as the defined number of target images have been displayed, the CPU core 21 ends the target image displaying process. On the other hand, if it is determined in step 35 that as many as the defined number of target images have not yet been displayed, the processes in steps 30 through 34 are repeated until as many as the defined number of target images are displayed.

Returning to the description of FIG. 12, after step 13, in step 14, time keeping for calculating the amount of time elapsed is started. That is, a time elapsed from step 14 is stored in the WRAM 22 as the elapsed time data 43 for update. In the next step 15, it is determined whether the elapsed time exceeds the limit time. This determination is made by determining whether the elapsed time indicated by the elapsed time data 43 in the WRAM 22 is larger than the predetermined limit time. If it is determined in step 15 that the elapsed time exceeds the limit time, a process in step 21, which will be described further below, is performed. On the other hand, if it is determined in step 15 that the elapsed time does not exceed the limit time, a process in step 16 of controlling the movement of the target image is performed.

In another embodiment, it may be determined in step 15 whether the number of inputs from the player onto the touch panel 13 at this attacking operation exceeds a predetermined number of inputs. Here, the number of inputs from the player onto the touch panel 13 at this attacking operation can be obtained by measuring the number of inputs detected in step 18, which will be described further below. Also, the predetermined number of inputs is, for example, set to be equal to the number of target images. Note that, if the limit time is provided as described above, a desired position may be easily specified by the player specifying the same position on the display screen many times. For example, in FIG. 5, even if the player merely keeps pounding an eye of the enemy character without paying attention to the moving target image, the player may eventually be able to specify the target image when the target image moves to the position of the eye. Therefore, even with the limit time being provided, the actual operation skill may not be correctly reflected on the progress of the game. To get around this problem, the number of inputs by the player is limited. With this, the game machine 1 can encourage the player not to keep pounding a desired position. Thus, the actual operation skill of the player can be correctly reflected on the progress of the game.

Figure 15:
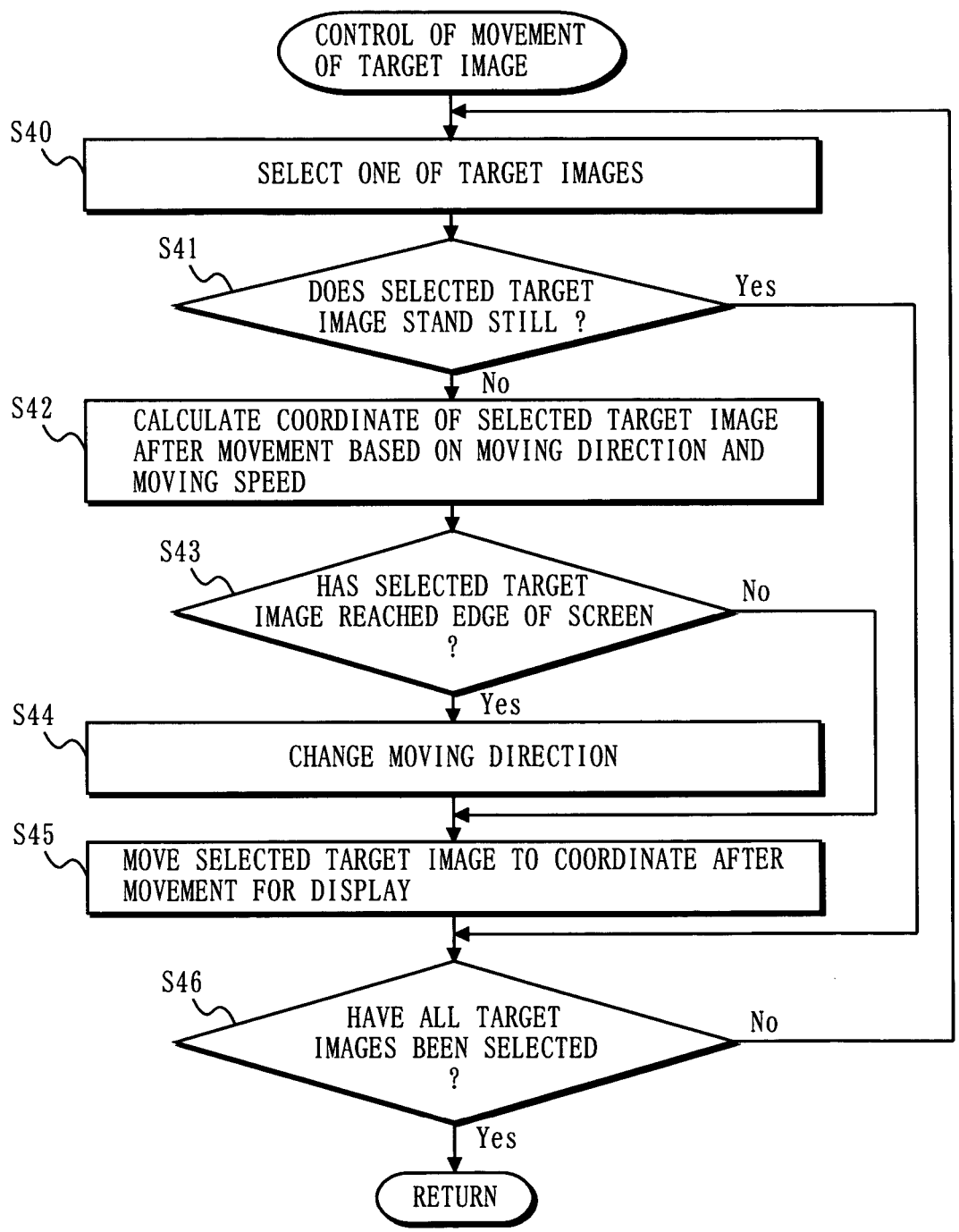
FIG. 15 is a flowchart showing a detailed flow of a process in step 16 of FIG. 12.

With reference to FIG. 15, a process of controlling the movement of the target images is described below in detail. FIG. 15 is a flowchart showing a detailed flow of the process in step 16 of FIG. 12. In the process of controlling the movement of the target images, first in step 40, one of the target images displayed on the display screen is selected. Note that, in the description of FIG. 15, the target image selected in step 40 is referred to as a selected target image. Next, in step 41, it is determined whether the selected target image stands still. This determination is made by referring to the speed vector data 421*b* of the target image data corresponding to the selected target image. That is, if the speed vector data 421*b* indicates 0, it is determined that the selected target image stands still. If the speed vector data 421*b* does not indicate 0, it is determined that the selected target image does not stand still. Note that the fact that the selected target image stands still means that the selected target image has already been specified. That is, the process in step 41 is a process of determining whether the selected target image has already been specified by the player.

If it is determined in step 41 that the selected target image stands still, a process in step 46 is performed, which will be described below. On the other hand, if it is determined in step 41 that the selected target image does not stand still, a process in step 42 is performed. That is, in step 42, coordinates of the selected target image are calculated, after movement is calculated based on the moving direction and the moving speed of the selected target image. Specifically, the CPU core 21 calculates the coordinates of the selected target image after movement based on the direction and speed indicated by the speed vector data 421*b* of the target image data 42 corresponding to the selected target image. The calculated coordinates after movement are stored in the WRAM 22 as the display coordinate data 421*a* of the target image data corresponding to the selected target image. That is, the display coordinate data 421*a* of the target image data corresponding to the selected target image is updated to the coordinates after movement calculated in step 42.

In the next step 43, it is determined whether the selected target image has reached the edge of the display screen. This determination is made by determining whether the coordinates calculated in step 42 indicate an area of the edge of the display screen. If it is determined in step 43 that the selected target image has not yet reached the edge of the display screen, the process in step 44 is skipped, and then a process in step 45 is performed. On the other hand, if it is determined that the selected target image has reached the edge of the display screen, the process in step 44 is performed.

In step 44, the moving direction of the selected image is changed. Specifically, the value of the speed vector data 421*b* of the target image data 42 corresponding to the selected target image is updated. In the first embodiment, the updated value of the moving direction of the selected target image is set so that an incident angle and a reflection angle of the selected target image, with respect to one side of the display screen, are equal to each other. In another embodiment, the reflection angle may be determined in a random manner. After step 44, a process in step 45 is performed. In step 45, the selected target image is displayed at the coordinates after movement. In the first embodiment, the coordinates after movement are assumed to be the coordinates calculated in step 42. In another embodiment, the coordinates after movement may be coordinates obtained by recalculation using the speed vector data 421*b* after change in step 45.

After step 45, it is determined in step 46 whether all target images have been selected. If it is determined in step 46 that not all target images have been selected, the processes in step 40 through 46 are repeated. In step 40, a target image that has not yet been selected in a loop of steps 40 through 46 is selected. If it is determined in step 46 that all target images have been selected, the CPU core 21 ends the process of controlling the movement of the target images. With this movement controlling process, the target images except the target image standing still are moved.

Figure 16:
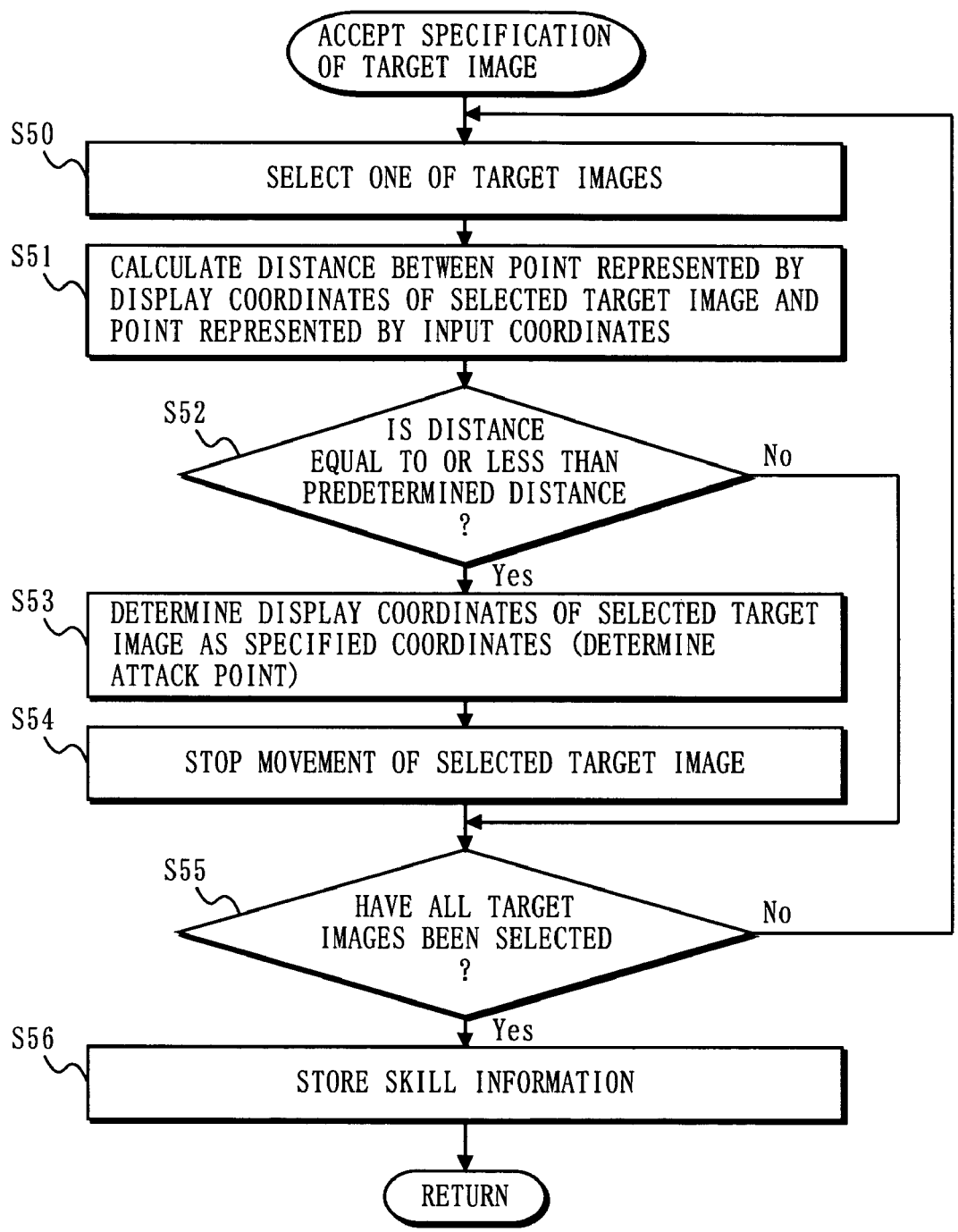
FIG. 16 is a flowchart showing a detailed flow of a process in step 19 of FIG. 12.

Returning again to the description of FIG. 12, in step 17, an input from the player onto the touch panel 13 is detected. Specifically, the CPU core 12 obtains, from the touch panel 13, coordinates indicative of the position at which an input from the player has been provided. The obtained coordinates are stored in the WRAM 22 as the input coordinate data 44. If no input has been provided from the player onto the touch panel 13 by the time of step 17, it is assumed that information indicative of no input is obtained from the touch panel 13. In the next step 18, it is determined whether an input from the player onto the touch panel 13 is detected. Specifically, it is determined whether the information obtained in step 17 indicates that no input has been provided. If an input is detected in step 18, a process of accepting specifications of target images in step 19 is performed. With reference to FIG. 16, the process of accepting specifications of target images is described below.

FIG. 16 is a flowchart showing a detailed flow of the process in step 19 of FIG. 12. In the process of accepting specifications of target images, first in step 50, one of the target images on the display screen is selected. Note that, in the description of FIG. 16, the target image selected in step 50 is referred to as a selected target image. In the next step 51, display coordinates of the selected target image are detected, and then a distance between a point represented by the detected display coordinates and a point represented by the input coordinates is calculated. Here, the display coordinates of the selected target image are derived from the display coordinate data 421a of the target image data corresponding to the selected target image. Also, the input coordinates are derived from the input coordinate data 44 stored in the WRAM 22 in step 17. In the next step 52, it is determined whether the distance calculated in step 51 is equal to or shorter than a predetermined distance. That is, it is determined whether the display coordinates are located within a range having its center at the input coordinates and a radius of the predetermined distance. Note that the predetermined distance is determined in advance in the game machine 1. The process of step 52 is a process for determining whether the player has successfully specified the selected target image.

If it is determined in step 52 that the distance calculated in step 51 is longer than the predetermined distance, that means that the player has not yet specified the selected target image or has not successfully specified the selected target image. Therefore, in this case, the processes in steps 53 and 54 are skipped, and then a process in step 55 is performed. On the other hand, if it is determined in step 52 that the distance calculated in step 51 is equal to or shorter than the predetermined distance, a process in step 53 is performed. That is, in step 53, the display coordinates of the selected target image are determined as the specified coordinates. Specifically, the coordinates indicated by the display coordinate data 421a included in the target image data 42 corresponding to the selected target image are stored in the WRAM 22 as the specified coordinate data 45. These specified coordinates indicate a specified position for attacking by the player against the enemy character. Therefore, the position indicated by the specified coordinate data is hereinafter referred to as an attack point. The process in step 53 is a process of determining the attack point.

In above step 53, the display coordinates of the selected target image are taken as the specified coordinates. Alternatively, the input coordinates may be taken as the specified coordinates. Also, the specified coordinates may be calculated based on the display coordinates of the selected target image and the input coordinates. For example, coordinates indicative of a midpoint between the display coordinates of the selected target image and the input coordinates may be taken as the specified coordinates.

After step 53, in step 54, the CPU core 21 stops the movement of the selected target image. That is, the vector indicated by the speed vector data 421b included in the target image data 42 corresponding to the selected target image is set to 0. Also, in step 54, the display state of the selected target image is changed. After step 54, a process in step 55 is performed.

In step 55, it is determined whether all target images have been selected. If it is determined in step 55 that not all target images have been selected, the processes in steps 50 through 54 are repeated. In step 50, a target image that has not yet been selected in a loop of steps 50 through 55 is selected. If it is determined in step 55 that all target images have been selected, a process in step 56 is performed. That is, in step 56, the skill information is stored. Specifically, the number of target images that have been specified by the player at this attacking operation is stored in the WRAM 22 as the skill information. This number is equal to the number of standing-still target images, that is the number of pieces of target image data 42 whose speed vector data 421b indicates 0. Upon completion of step 56, the CPU core 21 ends the process of accepting specifications of the target images.

Returning again to the description of FIG. 12, after step 19, in step 20, it is determined whether all target images on the display screen have been specified. This determination is made by determining whether all pieces of speed vector data 421b included in the image data in the WRAM 22 indicate 0. That is, if all pieces of speed vector data 421b indicate 0, it is determined that all target images on the display screen have been specified, and then a process in step 21 is performed. On the other hand, if a piece of speed vector data 421b indicates a value other than 0, it is determined that at least one target image on the display screen has not yet been specified, and therefore the processes in steps 15 through 20 are repeated.

Figure 17:
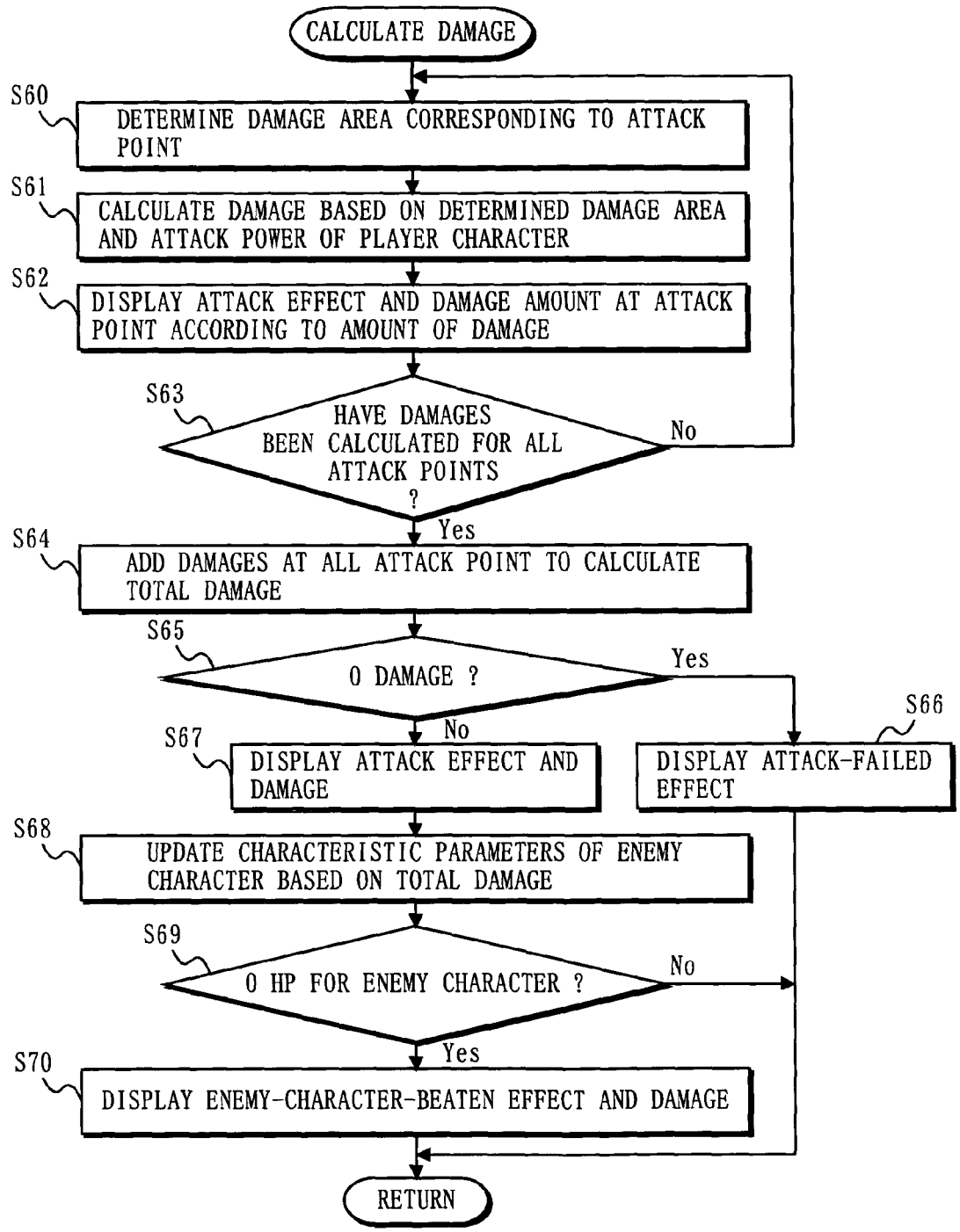
FIG. 17 is a flowchart showing a detailed flow of a process in step 21 of FIG. 12.

In step 21, a damage calculating process is performed. The damage calculating process is a process of calculating the amount of damage dealt to the enemy character. FIG. 17 is a flowchart showing a detailed flow of the process in step 21 of FIG. 12. In the damage calculating process shown in FIG. 17, first in step 60, a damage area corresponding to the attack point determined in step 53 is determined. Specifically, of the first to third damage areas indicated by the enemy character data 41, one that includes the position represented by the specified coordinates determined in step 53 is determined. If no damage area includes the position represented by the specified coordinates, that is, if the specified coordinates represents a position outside the area where the image data of the enemy character is displayed, no damage area is determined in step 60.

After step 60, in step 61, the amount of damage is calculated based on the damage area determined in step 60 and the attack power of the player character. Specifically, if the damage area determined in step 60 is the first damage area, the attack power of the player character is taken as representing the amount of damage. If the damage area determined in step 60 is the second damage area, a value obtained by multiplying the attack power of the player character by 2 represents the amount of damage. If the damage area determined in step 60 is the third damage area, a value obtained by multiplying the attack power of the player character by 0.5 represents the amount of damage. Here, it is assumed that the attack power of the player character is calculated with a predetermined scheme based on a capability value of the player character, weapons held by the player character, etc. Also, if no damage area is determined in step 60, the amount of damage is taken as 0. The amount of damage calculated in step 61 is stored in the WRAM 22 as the damage data 46 stored in the WRAM 22. In step 62, an effect image and a damage image which correspond to the amount of damage calculated in the immediately-preceding step 61 are displayed at the attack point determined in the immediately-preceding steps 60 and 61 (refer to FIG. 4B).

In step 63, it is determined whether the amount of damage has been calculated for every attack point. If it is determined that an attack point for which the amount of damage has not yet been calculated is present, the processes in steps 60 and 61 are repeated. On the other hand, if it is determined that the amount of damage has been calculated for every attack point, a process in step 64 is performed. That is, in step 64, total damage is calculated by adding all damages at all attack points together. Specifically, the CPU core 21 adds the amounts of damage indicated by the damage data 46 stored in steps 60 and 61 together to calculate a total damage. After the total damage is calculated, the damage data 46 stored in the WRAM 22 is deleted.

In the next step 65, it is determined whether the total damage calculated in step 64 is 0. If it is determined that the total damage is 0, a process in step 66 is performed. That is, in step 66, an effect display representing that the attack has been failed is performed, and then the damage calculating process ends. On the other hand, if it is determined in step 65 that the total damage is not 0, a process in step 67 is performed. That is, in step 67, an attack effect image and a damage image are displayed (refer to FIG. 4B). The amount of damage represented by this damage image is the total amount of damage calculated in step 65. Furthermore, in step 68, the characteristic parameters of the enemy character are updated based on the total amount of damage calculated in step 65. Specifically, the CPU core 21 subtracts the total amount of damage from the HP of the enemy character data 41 representing the enemy character displayed on the display screen. In response, the value of the HP of the enemy character displayed on the first LCD 11 is changed to the value after subtraction.

After step 68, it is determined in step 69 whether the HP of the enemy character is 0. That is, it is determined whether the HP after subtraction in the immediately-preceding step 68 is 0. If the HP of the enemy character is not 0, the damage calculating process ends. On the other hand, if the HP of the enemy character is 0, a process in step 70 is performed. That is, in step 70, an effect image representing that the enemy character is beaten is displayed. Upon completion of step 70, the CPU core 21 ends the damage calculating process.

In the first embodiment, all attack points are determined in step 19, and then in step 21, the amount of damage is calculated and the attack effect image is displayed. In another embodiment, the game machine 1 may calculate the amount of damage every time one attack point is specified, and then display an attack effect image at that attack point.

Returning again to the description of FIG. 11, after step 21, a process in step 22 is performed. In step 22, it is determined whether the battle is over. This determination is made by determining whether either one of the HP of the player character and the HP of all enemy characters is 0. That is, if either one of the HP of the player character and the HP of all enemy characters is 0, it is determined that the battle is over, and then the game process shown in FIG. 11 ends. On the other hand, if the HP of the player character is not 0 and the HP of at least one of the enemy characters is not 0, it is determined that the battle is not over, and then the procedure returns to the process in step 11. Thereafter, the processes in steps 11 through 22 are repeated until it is determined that the battle is over. This is the end of the description of the game process according to the first embodiment.

As described above, according to the first embodiment, the game machine 1 prompts the player to specify the target image moving around the display screen, thereby allowing the player to perform an attacking operation against the enemy character. Therefore, the player has to perform an input operation by paying attention to when to specify the target image and the position to be specified. That is, the game reflects an operation skill of specifying the target image at appropriate timing and at the appropriate position while viewing the moving image. With this, a game full of entertainment can be provided, compared with conventional games played merely with attention to the timing. Furthermore, with plural target images being displayed and with a limit time being provided to the player's attacking operation, the game can further reflect the player's operation skill.

Figures 18, 19:
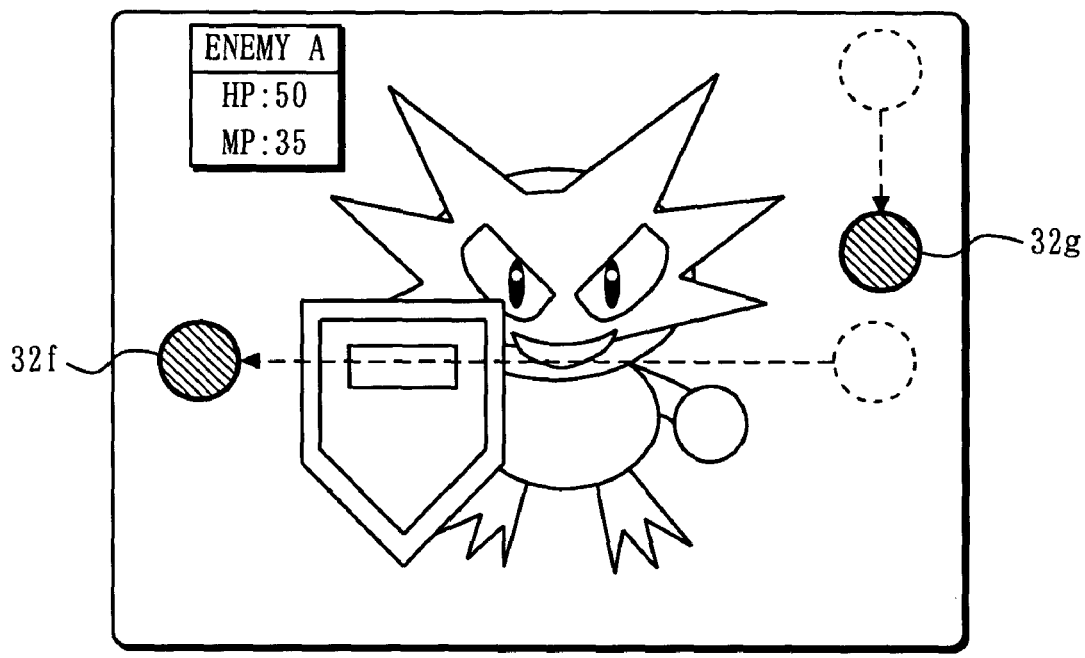
FIG. 18 is an illustration showing an example of a game image in an exemplary modification of a first embodiment.
FIG. 19 is an illustration showing a table for use in the exemplary modification shown in FIG. 18.
Figure 20:
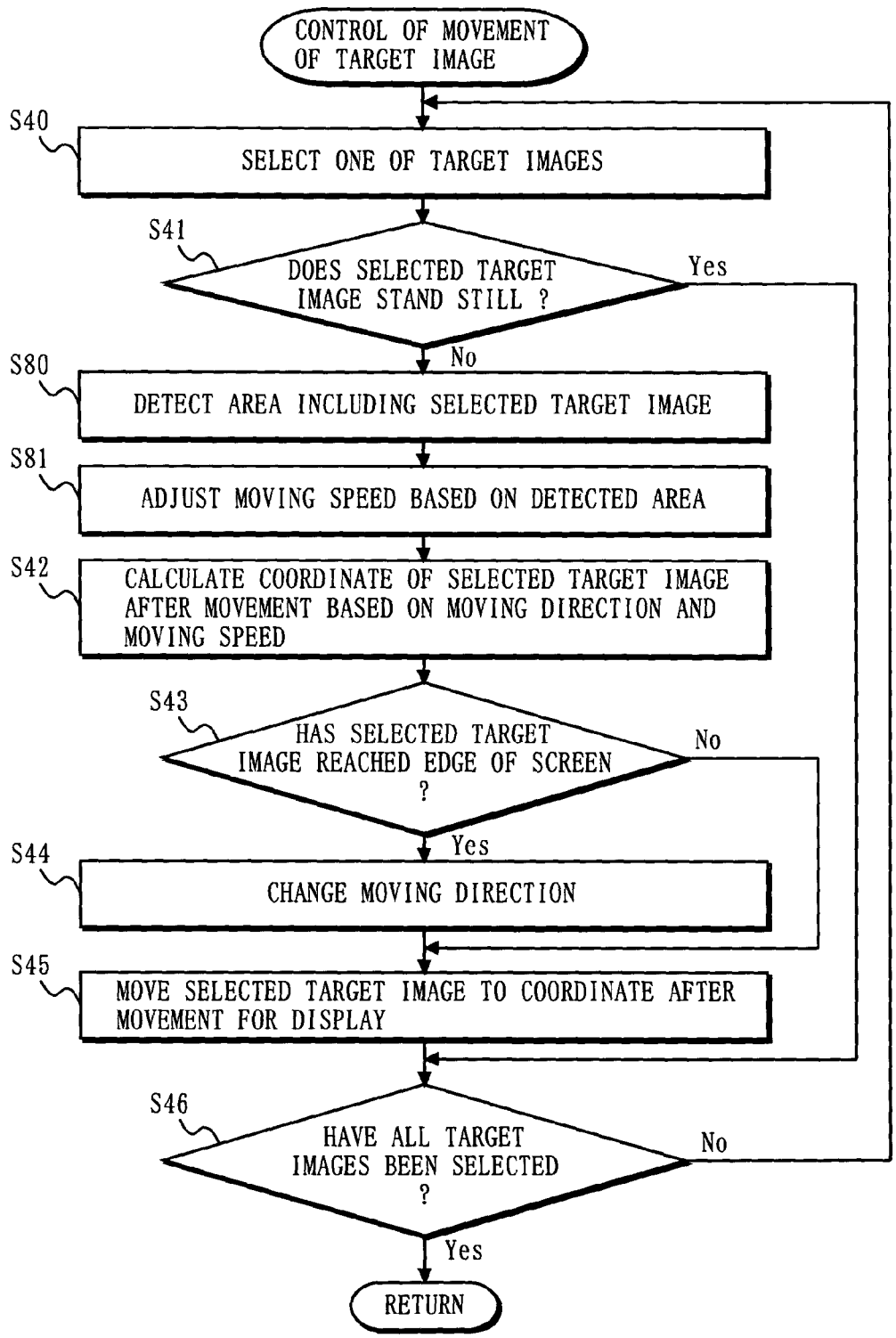
FIG. 20 is a flowchart showing a process of controlling the movement of the target images performed in the exemplary modification shown in FIG. 18.

Alternatively, an exemplary modification of the above-described first embodiment may be used. FIG. 18 is an illustration showing one example of a game image according to the exemplary modification of the first embodiment. In FIG. 18, the moving speed of a target image 32f passing over the area of the image of the enemy character is faster than the moving speed of a target image 32g passing over an area other than the area of the image of the enemy character. As such, when the target image passes over the area of the image of the enemy character, the moving speed of the target image may be sped up. With reference to FIGS. 19 and 20, a specific process is described below.

FIG. 19 is an illustration showing a table for use in the exemplary embodiment shown in FIG. 18. In the table shown in FIG. 19, each damage area is associated with the moving speed of the target image when the target image passes over the target image. In FIG. 19, the moving speed of the target image when passing over the first damage area is equal to a reference speed. The moving speed of the target image when passing over the second damage area is a speed twice as fast as the reference speed. The moving speed of the target image when passing over the third damage area is a half of the reference speed. Note that the reference speed is determined in advance in the game machine 1. In FIG. 19, the table is set such that the moving speed is faster as the attacking effect of the damage area is larger (the amount of damage is larger). With this, the game can further reflect the player's operation skill.

FIG. 20 is a flowchart showing a process of controlling the movement of the target image to be performed in the exemplary modification shown in FIG. 18. In this exemplary modification, in place of the processes shown in FIG. 15, processes shown in FIG. 20 are performed. In FIG. 20, processes identical to those in FIG. 15 are provided with the same step numbers, and are not described herein.

In the processes shown in FIG. 20, if "No" is the determination made in step 41, a process in step 80 is performed. That is, in step 80, the area including the selected target image is detected. Here, a possibly-detected area is any one of the first through third damage areas and an area other than the image of the enemy character. In the next step 81, the moving speed of the selected target image is adjusted based on the area detected in step 80. Specifically, the CPU core 21 calculates the moving speed by using the table shown in FIG. 19. If the target image is included in the area other than the image of the enemy character, the moving speed is not adjusted. With the process described above, the moving speed can be varied in accordance with the area including the target image. In this exemplary modification, the moving speed of the target image is varied in accordance with the damage area. Alternatively, the moving speed may be made uniform in the area of the image of the enemy character.

Figures 21, 22:
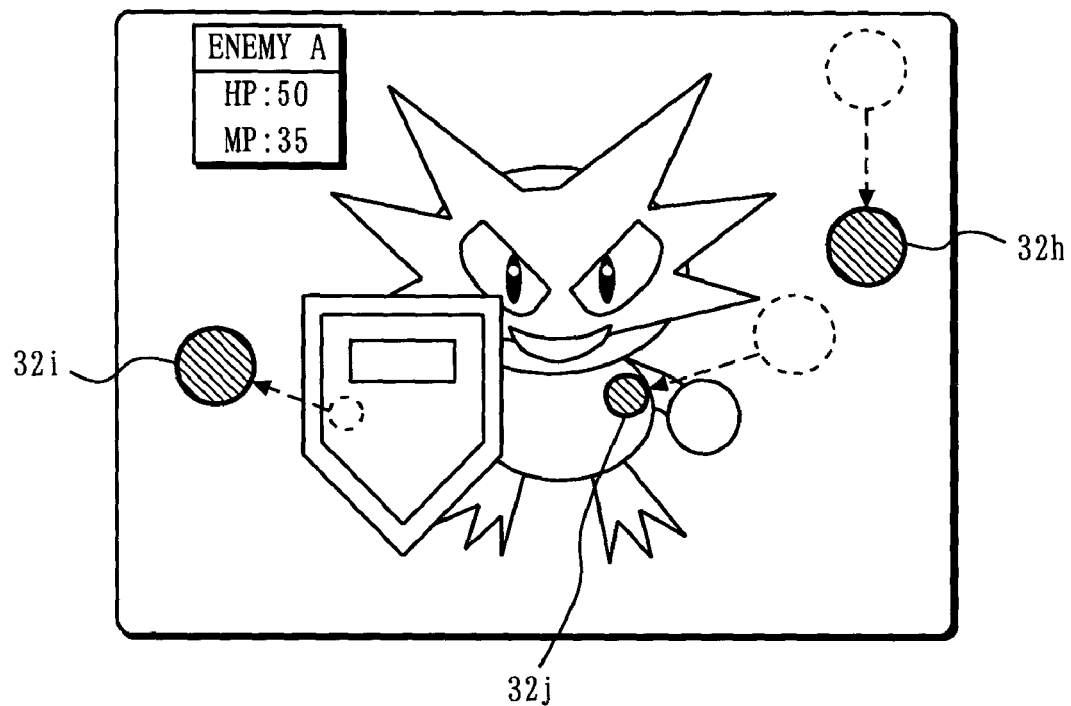
FIG. 21 is an illustration showing another example of a game image in an exemplary modification of the first embodiment.
FIG. 22 is an illustration showing a table for use in the exemplary modification of the first embodiment.

Also in another exemplary modification, when the target image passes over the area of the enemy character, the size of the target image may be decreased. Specifically, in the table shown in FIG. 19, the size of the target image is predetermined in place of the moving speed. Then in step 81 of FIG. 20, the size of the selected target image may be adjusted based on the area detected in step 80. FIG. 21 is an illustration showing another example of a game image according to the exemplary modification of the first embodiment. In FIG. 21, a target image 32*j* passing over the area of the image of the enemy character is displayed as being smaller than target images 32*h* and 32*i* passing over the area other than the image of the enemy character. As such, while the target image is passing over the area with an attack effect (with damage to be given), the size of the target image is made small. With this, the game can further reflect the player's operation skill. In FIG. 21, the size of the target image may be varied in accordance with the damage area.

Furthermore, in another exemplary modification in which plural target images are displayed, the damage given to the enemy character and the size of the target image may be varied for each selected target image. FIG. 22 shows one example of a table for use in such an exemplary modification. In the table shown in FIG. 22, each target image is associated with a reference damage and the size of the target image. In the game process, with reference to this table, the size of the target image is determined. Also with reference to this table, the amount of damage given to the target image is calculated. Specifically, in step 23 of FIG. 13, the CPU core 21 determines the size of the target image based on the table shown in FIG. 22. Also, in step 61 of FIG. 17, the amount of damage is calculated by using the table shown in FIG. 22. For example, the amount of damage may be calculated by taking the reference damage in this table as the attack power of the player character.

Also, in another embodiment, the image of the enemy character displayed on the first LCD 11 may be moved. With this, the degree of difficulty in player's operation of specifying the enemy character can be increased. Here, the process of moving the image of the enemy character is performed, for example, immediately after step 16 of FIG. 11. As with the case of moving the target image, the image of the enemy character may be moved by using an algorithm that allows the movement according to a rule preset in the game machine 1 or the movement in a random manner. Also, in addition to moving the image of the enemy character, the game machine 1 may vary the size of the image of the enemy character.

Other than the above, various exemplary modifications of the first embodiment can be devised as follows. That is, the size, number, and moving speed of the target images may be varied according to the degree of difficulty in game, the weapons (items) held by the player character, the level of the player character, the strength of the enemy character, or the like. For example, when an item or magic appearing in the game is used, a weak point of the enemy character (the second damage area in the first embodiment) is displayed as being large. This makes it easy for the player to specify that weak point. Also, for example, when the enemy character uses magic, a portion with a high defensive power of the enemy character (the third damage area in the first embodiment) is displayed as being large. This makes it difficult for the player to deal maximum damage to the enemy character.

Also, in the first embodiment, description is exemplarily made to the case where the player character performs an attacking operation for dealing damage to the enemy character. This is not meant to be restrictive, but can be applied to another game process. For example, the game machine 1 may display an image of a wounded player character. Then, when the player specifies the target image at a wounded part, the game machine 1 performs a process of causing the player's wound to heal. Also, the attack against the player character is not restricted to the attack that allows the HP to be decreased. For example, when a specific weak point is specified, a special effect (damage) can be given to the enemy character. Specifically, once an eye of the enemy character is successfully attacked (when the target image is specified at the position of an eye of the enemy character), the enemy character may become prone to miss the player character.

Second Embodiment

Next, a second embodiment according to the present invention is described. In the second embodiment, description is made to the case where the present invention is applied to a game that is different from the game according to the first embodiment. Note that the external view and internal structure of a game machine 1 are the same as those illustrated in FIGS. 1 and 2, and therefore are not described herein.

First, an outline of the game to be performed in the game machine is described with reference to FIGS. 23 and 24A through 24C. FIGS. 23 and 24A through 24C are illustrations showing examples of a game image to be displayed on the display screen of the first LCD 11. As shown in (a) of FIG. 23, in the second embodiment, the game machine 1 causes a game image to be displayed on the display screen of the first LCD 11, the game image representing that plural target images are moving. Also, an instruction "Stop the enemy with a regular triangle!!" is displayed on the upper portion of the display screen. Following this instruction, the player specifies target images. That is, the player performs an input operation onto the touch panel 13 so that the specified positions of the target images form a regular triangle. Hereinafter, a graphic indicated by the game machine 1 to the player (here, a regular triangle) is referred to as a reference graphic. In (b) of FIG. 23, a game image is shown when the player's inputs are performed according to the instruction. In this case, the game machine 1 causes "OK" to be displayed on the display screen to indicate that the game has been successfully played (refer to (d) of FIG. 23). On the other hand, in (c) of FIG. 23, a game image is shown when the player's inputs are not performed according to the instruction. In this case, the game machine 1 causes "NG" to be displayed on the display screen to indicate that the game has been failed (refer to (e) of FIG. 23).

Figure 23:
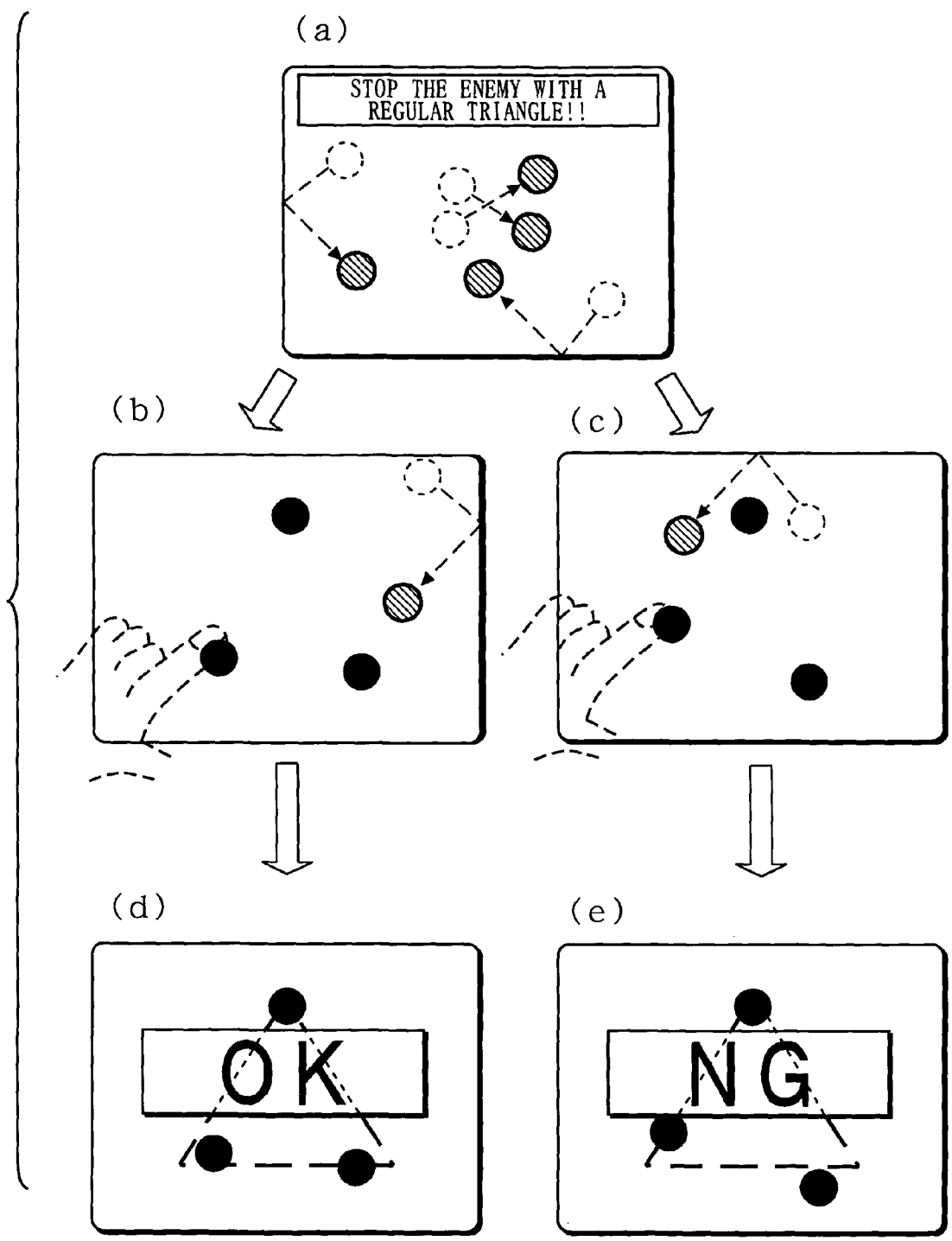
FIG. 23 is an illustration showing one example of a game image displayed on a display screen of a first LCD 11 according to a second embodiment.
Figure 24A:
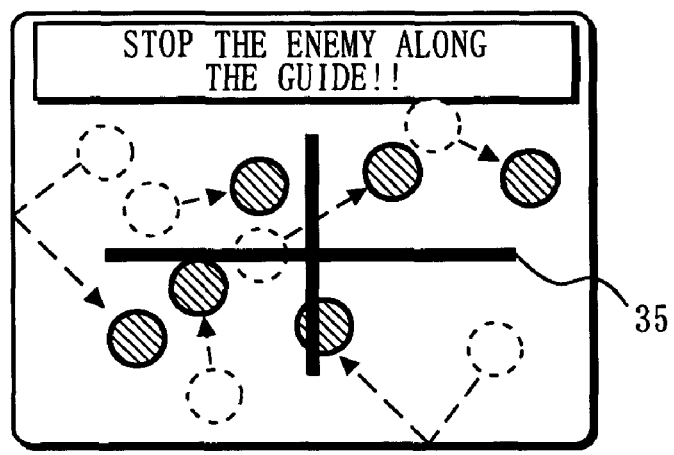
FIGS. 24A, 24B, and 24C are illustrations showing examples of a game image displayed on the display screen of a first LCD 11 according to the second embodiment.
Figure 24B:
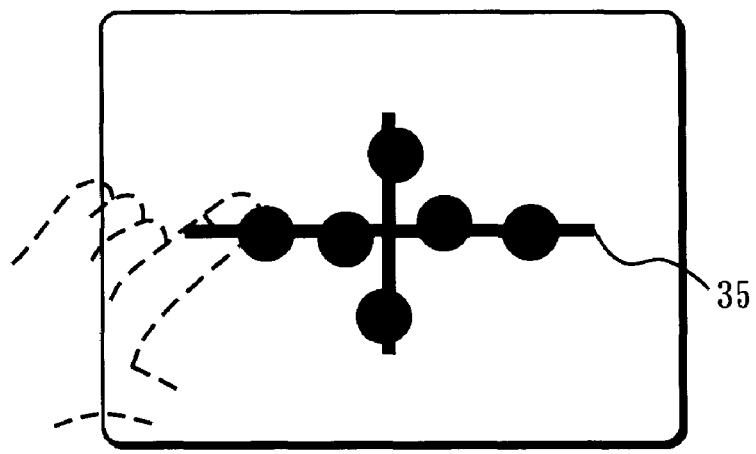
Figure 24C:
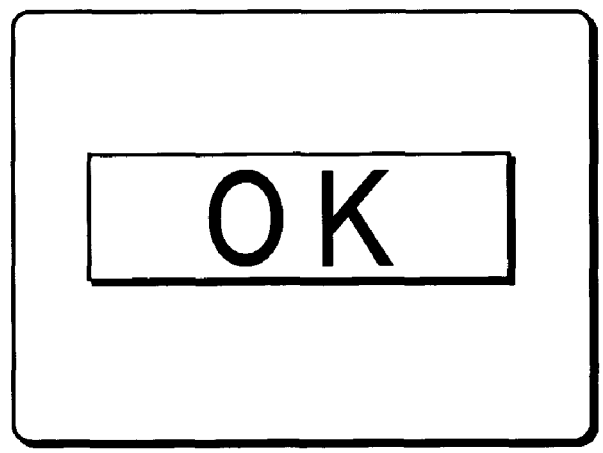

FIGS. 24A through 24C are illustrations showing game images when an instruction different from that in FIG. 23 is provided to the player. In FIGS. 24A through 24C, a cross-shaped guide 35 is displayed in addition to the target images. Also, an instruction "Stop the enemy along the guide!!" is displayed on the upper portion of the display screen. That is, in FIGS. 24A through 24C, the guide 35 represents the reference graphic. Following this instruction, the player performs an input operation onto the touch panel 13 so as to specify the target images on the guide 35 (FIG. 24B). After the player has performed an input operation according to the instruction, the game machine 1 causes "OK" to be displayed on the display screen to indicate that the game has been successfully played.

Figure 25:
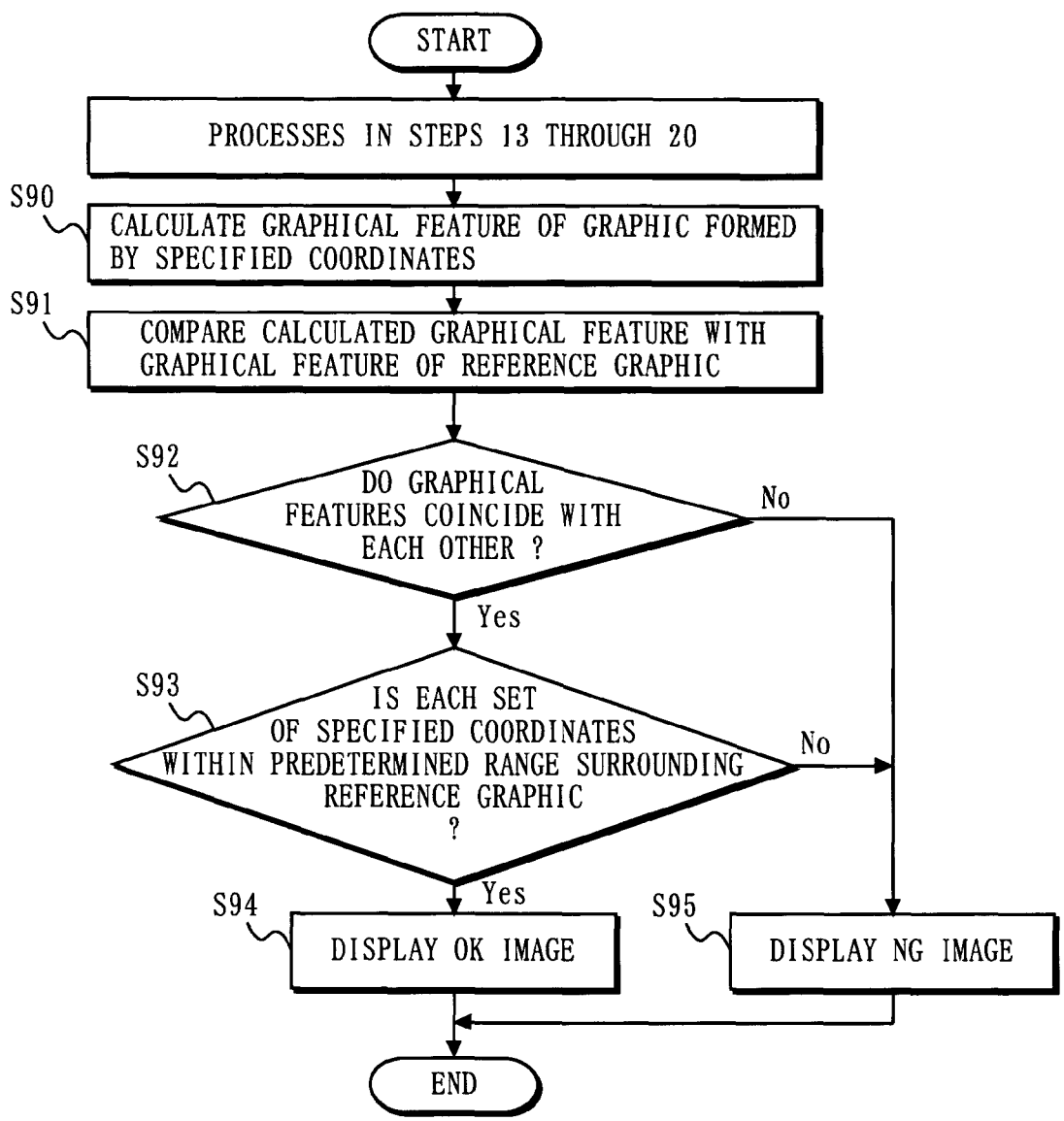
FIG. 25 is a flowchart showing a flow of a game process to be performed on the game machine according to the second embodiment.

Next, a game process to be executed in the game machine according to the second embodiment is described. FIG. 25 is a flowchart showing a flow of the game process to be executed in the game machine according to the second embodiment. The processes from powering-on the game machine to starting the game are identical to those in the first embodiment. The flowchart shown in FIG. 25 shows a game process after the game is started.

Once the game process is started, processes of displaying and moving the target images, detecting inputs from the player onto the touch panel 13, etc., are first performed.

Specifically, the processes in steps 13 through 20 shown in FIG. 12 according to the first embodiment are performed. Then, processes in step 90 onward are performed.

In step 90, a graphical feature of a graphic (input graphic) formed by a plurality of sets of specified coordinates obtained from the player's inputs is calculated. The graphical feature is an index indicating a feature of the input graphic, and is, for example, the number of vertices of the input graphic (that is, the number of sets of specified coordinates). That is, in step 90, the number of vertices of the input graphic is calculated. This makes it possible for the game machine 1 to determine the input graphic.

In step 91, the graphical feature calculated in step 90 is compared with the graphical feature of the above-described reference graphic. Here, data indicative of the reference graphic is provided in advance in the game machine 1. Specifically, the coordinates of vertices of the reference graphic are stored in the WRAM 22 of the game machine 1. In step 91, the CPU core 21 compares the number of sets of specified coordinates with the number of vertices of the reference graphic. In the next step 92, it is determined whether the graphical feature calculated in step 91 coincides with the graphical feature of the reference graphic. That is, it is determined whether the number of sets of specified coordinates coincides with the number of vertices of the reference graphic. This determination makes it possible to determine whether the input graphic is of the same type as that of the reference graphic. In the example of FIG. 23, it is determined whether the input graphic is a rectangle.

If it is determined in step 92 that these graphical features do not coincide with each other, a process in step 95 is performed. That is, in step 95, the CPU core 21 causes "NG" to be displayed so as to indicate that the game has been failed. On the other hand, if it is determined in step 92 that these graphical features coincide with each other, a process in step 93 is performed. That is, it is determined whether each set of the specified coordinates is included in a predetermined range surrounding the reference graphic. Here, the predetermined range is defined by a predetermined distance away from each side of the reference graphic. That is, it is determined in step 93 whether each set of the specified coordinates is included within the predetermined distance away from each side of the reference graphic. Therefore, if all sets of the specified coordinates are located within the predetermined distance away from each side of the reference graphic, the determination in step 93 is positive. Conversely, if at least one set of specified coordinates is not located within the predetermined distance away from each side of the reference graphic, the determination in step 93 is negative.

With the above-described steps 91 through 93, it is determined whether the player has performed inputs according to the instruction, that is, whether the input graphic coincides with the reference graphic. A scheme for use in this determination may be arbitrary. For example, in the case where it is determined whether the input graphic is a regular triangle as shown in FIG. 23, it may be determined whether every distance between adjacent sets of the specified coordinates is equal to one another.

If the determination in step 93 is positive, a process in step 94 is performed. That is, in step 94, the CPU core 21 causes "OK" to be displayed on the display screen so as to indicate that the game has been successfully performed. On the other hand, if the determination in step 93 is negative, a process in step 95 is performed. After the process in step 94 or 95, the CPU core 21 ends the game process.

As described above, the game according to the second embodiment is played by specifying target images moving on the display screen so that the specified target images have a predetermined positional relation. Also in this game, as with the first embodiment, the player has to perform an input operation with attention not only to the time when the target images are specified but also to the positions of the target images when specified. With this, a game requiring a higher operation skill can be provided, compared with conventional games played merely with attention to the timing. Therefore, a game full of entertainment can be provided.

Also, as with the second embodiment, in the first embodiment, a positional relation between the plural target images specified by the player may be reflected on the game process. That is, the game machine 1 may vary the characteristic parameters of the enemy character in accordance with the positional relation between the plural target images. For example, when the positions of three target images specified by the player correspond to vertices of a regular triangle, a damage larger than a normal damage may be given to the enemy character.

Figure 26:
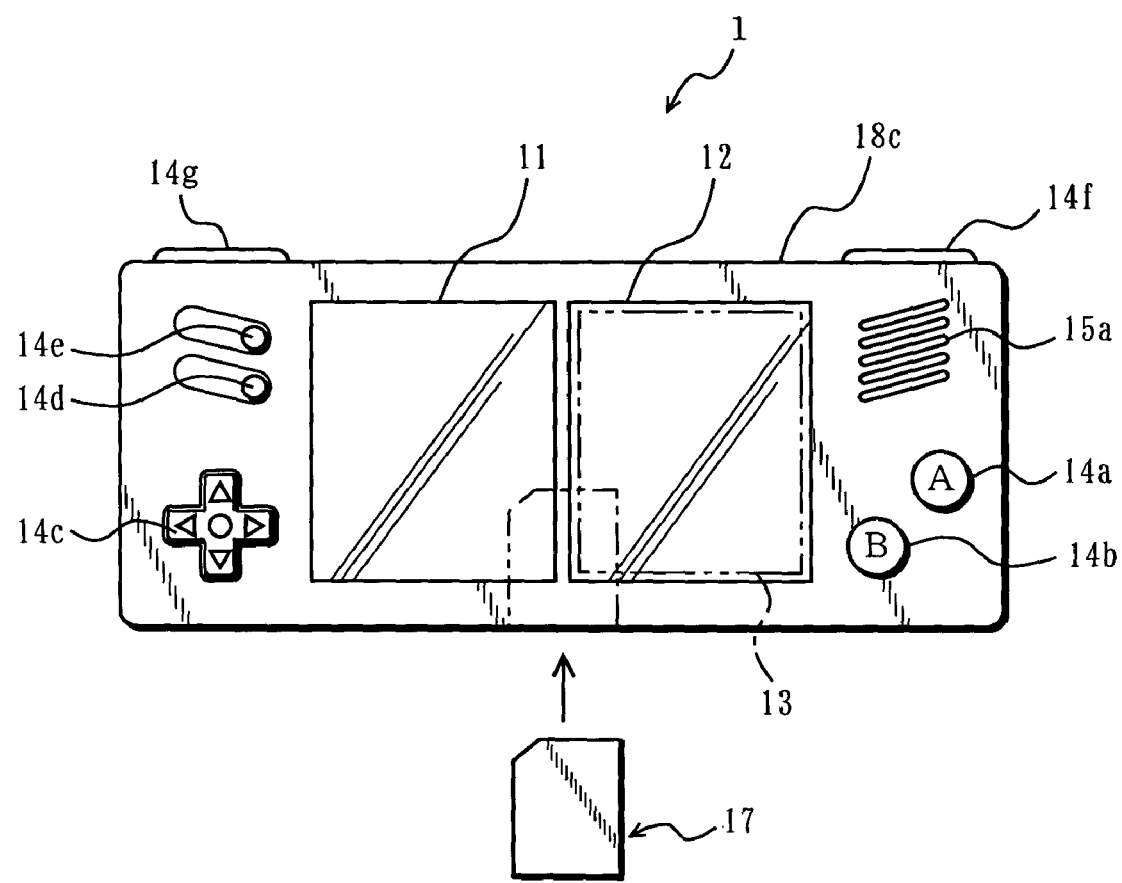
FIG. 26 is an illustration showing an exemplary modification of a portable game machine.

Here, in the above-described embodiments, as one example of a liquid crystal display unit having two screens, two LCDs 11 and 12 vertically disposed (two vertical screens) are exemplarily described. Alternatively, as shown in FIG. 26, the two LCDs 11 and 12 for two screens may be horizontally disposed on a horizontally-oblong housing 18c without including the upper housing 18b. In this case, in consideration of the fact that a large majority of users are right-handed, the first LCD 11 with the touch panel 13 provided thereon is disposed on the right side, while the second LCD 12 is disposed on the left side. For portable game machines for left-handed users, the disposition of these LCDs are reversed.

Figure 27:
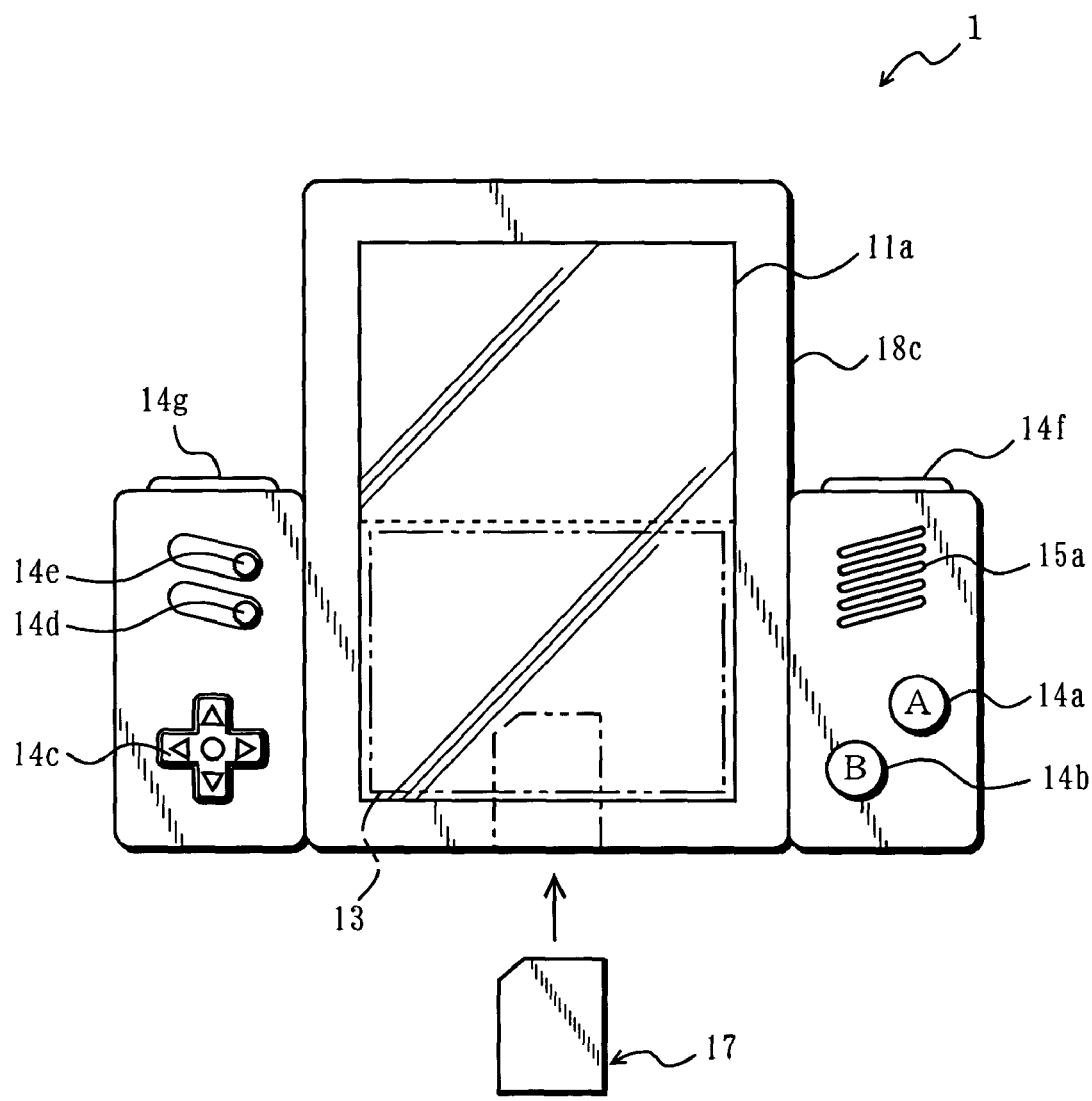
FIG. 27 is an illustration showing another exemplary modification of the portable game machine.
Figure 28:
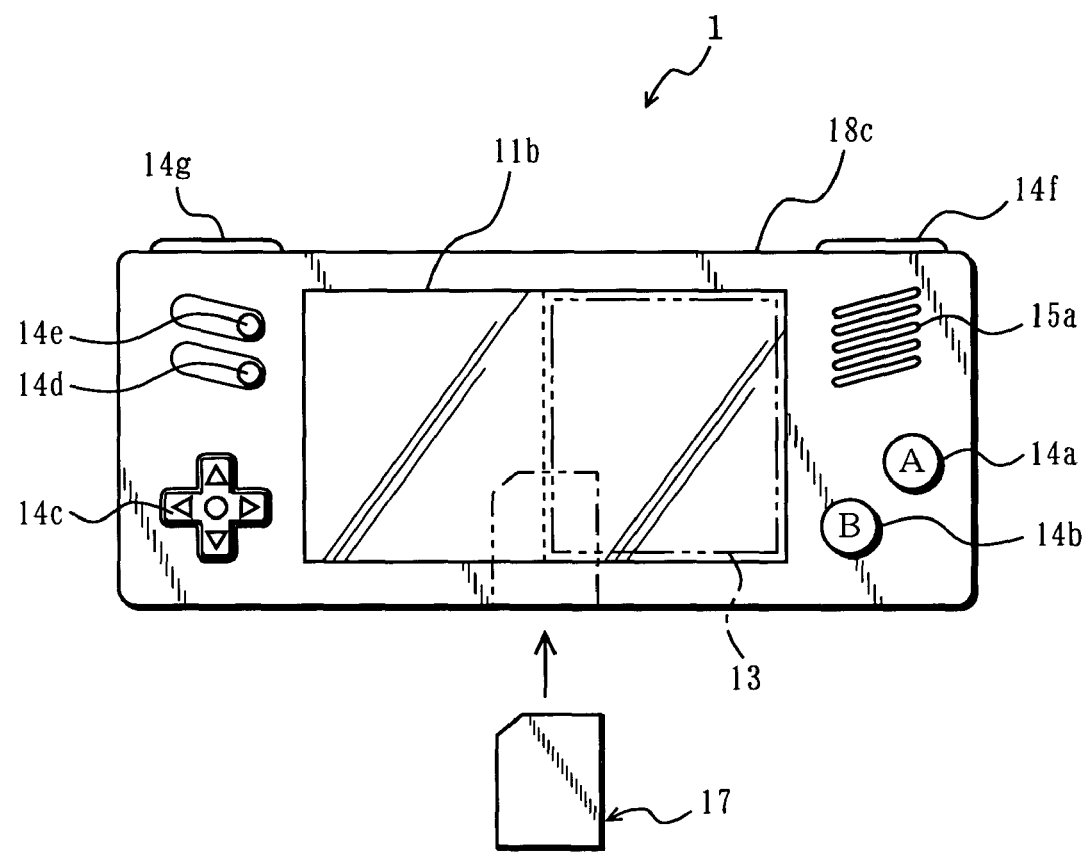
FIG. 28 is an illustration showing still another exemplary modification of the portable game machine.

In another exemplary disposition, in place of the disposition in which two physically-separated LCDs 11 and 12 are vertically disposed, a single, vertically-oblong LCD 11a having a height that is twice as long as its width (that is, a physically-integrated LCD having a display area for two screens in the vertical direction) may be used, as shown in FIG. 27. By using such an LCD 11, a liquid crystal display unit for two screens in the vertical direction may be disposed for displaying game images for two screens in the vertical direction (that is, two game images are vertically and adjacently displayed without a boundary). Also, as shown in FIG. 28, a single, horizontally-oblong LCD 11b having a width that is twice as long as its height may be used to horizontally display map images for two screens (that is, two images are horizontally and adjacently displayed without a boundary). That is, in the examples shown in FIGS. 27 and 28, a single physically-integrated screen is divided into two for use, thereby displaying a plurality of game images.

While the invention has been described in detail, the foregoing description is in all aspects illustrative and not restrictive. It is understood that numerous other modifications and variations can be devised without departing from the scope of the invention.

What is claimed is:

1. A data storage medium having stored therein a game program causing a computer of a game machine, including a display screen for displaying a game image and a touch panel covering the display screen, to perform a method comprising:

a display control step of displaying, on the display screen, a game image, including at least one targeting image selectable by a player and indicative of a target to be specified by a player and including a game character image that is different from the at least one targeting image;

a movement control step of moving the at least one targeting image substantially independent of the game character image so that the at least one targeting image at least temporarily passes over the game character image;

an input coordinate detecting step of detecting, when the player provides an input onto the touch panel, input coordinates indicative of a position of the input on the display screen;

a specified coordinate determining step of determining, when display coordinates of any one of the plurality of targeting images, at the time of the input provided from the player onto the touch panel, and the input coordinates are within a predetermined range, that the targeting image has been specified by the player, and determining, based on at least one of a position represented by the display coordinates and a position represented by the input coordinates, specified coordinates indicative of a position specified by the player; and a parameter updating step of varying a characteristic parameter, indicative of a characteristic of a game character represented by the game character image, based on a positional relation between the specified coordinates and the game character image.

2. The data storage medium according to claim 1, wherein the game program further causes the computer to perform a movement stopping step of stopping the movement of the targeting image specified by the player, when the specified coordinates are determined.

3. The data storage medium according to claim 1, wherein in the parameter updating step, when the specified coordinates represent a position on the game character image, the characteristic parameter of the game character represented by the game character image is varied.

4. The data storage medium according to claim 3, wherein an area where the game character image is displayed includes a plurality of decision coordinate areas defined in association with the area, and in the parameter updating step, a degree of variance of the characteristic parameter is changed in accordance with one of the plurality of decision coordinate areas that includes the specified coordinates.

5. The data storage medium according to claim 1, wherein the steps further comprise a time keeping step of keeping an elapsed time from the start of the movement of the plurality of targeting images, and the movement control step, the input coordinate detecting step, the display coordinate detecting step, and the specified coordinate determining step are repeated until the elapsed time exceeds a predetermined limit time.

6. The data storage medium according to claim 1, wherein the steps further comprise a number-of-inputs counting step of counting the number of inputs provided from the player onto the touch panel after the start of the movement of the targeting images, and the movement control step, the input coordinate detecting step, the display coordinate detecting step, and the specified coordinate determining step are repeated until the number of inputs exceeds a predetermined number.

7. The data storage medium according to claim 1, wherein the game character image displayed in the display control step is an image of at least one of a plurality of game characters stored in advance in the game machine, and the steps further comprise a first changing step of changing at least one of a size, a number, a moving pattern, and a moving speed of each of the plurality of targeting images in accordance with a type of the game character.

8. The data storage medium according to claim 1, wherein the steps further comprise:

a skill information storing step of storing, as skill information of the player, at least one of the number of points represented by the specified coordinates determined within a predetermined time, a distance between the point represented by the input coordinates and the point represented by the display coordinates, and a ratio of the points represented by the specified coordinates, determined with the predetermined time, with respect to the number of inputs provided onto the touch panel within the predetermined time; and a second changing step of changing, in accordance with the skill information, at least one of a size, a number, a moving pattern, and a moving speed of each of the plurality of targeting images to be displayed after the skill information is stored.

9. The data storage medium according to claim 1, wherein the steps further comprise a character movement control step of moving the game character image when the plurality of targeting images are moved.

10. The data storage medium according to claim 1, wherein the steps further comprise a moving speed changing step of changing a moving speed of the targeting image when the targeting image passes over an entire or part of an area of the game character image.

11. The data storage medium according to claim 10, wherein an area where the game character image is displayed includes a plurality of decision coordinate areas defined in association with the area, in the image display changing step, the moving speed of the targeting image is increased when the targeting image passes over a predetermined one of the plurality of decision coordinate areas, and in the parameter updating step, when the specified coordinates are included in the predetermined decision coordinate area, a degree of variance of the characteristic parameter is increased by a greater amount compared with a case where the specified coordinates are included in one of the decision coordinate areas other than the predetermined decision coordinate area.

12. The data storage medium according to claim 1, wherein the steps further comprise an image display changing step of decreasing a size of the targeting image when passing over an entire or part of the game character image, and in the specified coordinate determining step, a size of the predetermined range is changed in accordance with the size of the targeting image.

13. The data storage medium according to claim 12, wherein an area where the game character image is displayed includes a plurality of decision coordinate areas defined in association with the area, in the moving speed changing step, the size of the targeting image is decreased when the targeting image passes over a predetermined one of the plurality of decision coordinate areas, and in the parameter updating step, when the specified coordinates are included in the predetermined decision coordinate area, a degree of variance of the characteristic parameter is increased by a greater amount compared with a case where the specified coordinates are included in one of the decision coordinate areas other than the predetermined decision coordinate area.

14. The data storage medium according to claim 1, wherein
the plurality of targeting images are of types different in appearance, and
in the parameter updating step, the characteristic parameter is changed differently in accordance with a type of the targeting image represented by the specified coordinates.

15. The data storage medium according to claim 1, wherein the game character is a player character controlled based on input from the player.

16. The data storage medium according to claim 1, wherein the game image also includes a player character that is controlled based on input from the player, and the game character is an enemy character.

17. The data storage medium according to claim 1, wherein the game character image is movable independent of the at least one targeting image such that the game character image and the at least one targeting image are simultaneously movable.

18. A data storage medium having stored therein a game program causing a computer of a game machine, including a display screen for displaying a game image and a touch panel covering the display screen, to perform the steps comprising:
    a display control step of displaying, on the display screen, a game image, including a targeting image selectable by a player and indicative of a target to be specified by a player and including a game character image that is different from the targeting image;
    a movement control step of moving the targeting image substantially independent of the game character image so that the targeting image at least temporarily passes over the game character image;
    an input coordinate detecting step of detecting, when the player provides an input onto the touch panel, input coordinates indicative of a position of the input on the display screen;
    a specified coordinate determining step of determining, when display coordinates of the targeting image at the time of the input provided from the player onto the touch panel and the input coordinates are within a predetermined range, that the targeting image has been specified by the player, and determining, based on at least one of a position represented by the display coordinates and a position represented by the input coordinates, specified coordinates indicative of a position specified by the player; and
    a parameter updating step of varying a characteristic parameter, indicative of a characteristic of a game character represented by the game character image, based on a positional relation between the specified coordinates and the game character image.

19. The data storage medium according to claim 18, wherein
the game program further causes the computer to perform a movement stopping step of stopping the movement of the targeting image specified by the player, when the specified coordinates are determined.

20. The data storage medium according to claim 18, wherein
in the parameter updating step, when the specified coordinates represent a position on the game character image, the characteristic parameter of the game character represented by the game character image is varied.

21. The data storage medium according to claim 20, wherein
an area where the game character image is displayed includes a plurality of decision coordinate areas defined in association with the area, and
in the parameter updating step, a degree of variance of the characteristic parameter is changed in accordance with one of the plurality of decision coordinate areas that includes the specified coordinates.

22. The data storage medium according to claim 18, wherein
the steps further comprise a time keeping step of keeping an elapsed time from the start of the movement of the targeting image, and
the movement control step, the input coordinate detecting step, the display coordinate detecting step, and the specified coordinate determining step are repeated until the elapsed time exceeds a predetermined limit time.

23. The data storage medium according to claim 18, wherein
the steps further comprise a number-of-inputs counting step of counting the number of inputs provided from the player onto the touch panel after the start of the movement of the targeting image, and
the movement control step, the input coordinate detecting step, the display coordinate detecting step, and the specified coordinate determining step are repeated until the number of inputs exceeds a predetermined number of times.

24. The data storage medium according to claim 18, wherein
the game character image displayed in the display control step is an image of at least one of a plurality of game characters stored in advance in the game machine, and
the steps further comprise a first changing step of changing at least one of a size, a number, a moving pattern, and a moving speed of the targeting image, in accordance with a type of the game character.

25. The data storage medium according to claim 18, wherein
the steps further comprise:
    a skill information storing step of storing, as skill information of the player, at least one of the number of points represented by the specified coordinates determined within a predetermined time, a distance between the point represented by the input coordinates and the point represented by the display coordinates, and a ratio of the points represented by the specified coordinates determined with the predetermined time with respect to the number of inputs provided onto the touch panel within the predetermined time; and
    a second changing step of changing, in accordance with the skill information, at least one of a size, a number, a moving pattern, and a moving speed of the targeting image to be displayed after the skill information is stored.

26. The data storage medium according to claim 18, wherein
the steps further include a character movement control step of moving the game character image when the targeting image is moved.

27. The data storage medium according to claim 18, wherein
the steps further comprise a moving speed changing step of changing a moving speed of the targeting image when the target image passes over an entire or part of an area of the game character image.

28. The data storage medium according to claim 27, wherein an area where the game character image is displayed includes a plurality of decision coordinate areas defined in association with the area, in the moving speed changing step, the moving speed of the targeting image is increased when the targeting image passes over a predetermined one of the plurality of decision coordinate areas, and in the parameter updating step, when the specified coordinates are included in the predetermined decision coordinate area, a degree of variance of the characteristic parameter is increased by a greater amount, compared with a case where the specified coordinates are included in one of the plurality of decision coordinate areas other than the predetermined decision coordinate area.

29. The data storage medium according to claim 18, wherein the steps further comprise an image display changing step of decreasing a size of the targeting image when passing over an entire or part of the game character image, and in the specified coordinate determining step, a size of the predetermined range is changed in accordance with the size of the targeting image.

30. The data storage medium according to claim 29, wherein an area where the game character image is displayed includes a plurality of decision coordinate areas defined in association with the area, in the image display changing step, the size of the targeting image is decreased when the targeting image passes over a predetermined one of the plurality of decision coordinate areas, and in the parameter updating step, when the specified coordinates are included in the predetermined decision coordinate area, a degree of variance of the characteristic parameter is increased by a greater amount, compared with a case where the specified coordinates are included in one of the plurality of decision coordinate areas other than the predetermined decision coordinate area.

31. The data storage medium according to claim 18, wherein the game character is a player character controlled based on input from the player.

32. The data storage medium according to claim 18, wherein the game image also includes a player character that is controlled based on input from the player, and the game character is an enemy character.

33. The data storage medium according to claim 18, wherein the game character image is movable independent of the targeting image such that the game character image and the targeting image are simultaneously movable.

34. A data storage medium having stored therein a game program causing a computer of a game machine, including a display screen for displaying a game image and a touch panel covering the display screen, to perform a method comprising:

a display control step of displaying, on the display screen, a game image, including at least one targeting image selectable by a player and indicative of a target to be specified by a player and including a game character image that is different from the at least one targeting image;

a movement control step of moving the at least one targeting image substantially independent of the game character image on the game image;

an input coordinate detecting step of detecting, when the player provides an input onto the touch panel, input coordinates indicative of a position of the input on the display screen;

a specified coordinate determining step of determining, when display coordinates of any one of the targeting images at the time of the input provided from the player onto the touch panel and the input coordinates are within a predetermined range, specified coordinates indicative of a position specified by the player, based on at least one of a position represented by the display coordinates and a position represented by the input coordinates; and a game image changing step of changing a display state of the game image, based on a positional relation among positions represented by the specified coordinates determined in the specified coordinate determining step.

35. The data storage medium according to claim 21, wherein the game character is a player character controlled based on input from the player.

36. The data storage medium according to claim 34, wherein the game image also includes a player character that is controlled based on input from the player, and the game character is an enemy character.

37. The data storage medium according to claim 34, wherein the game character image is movable independent of the at least one targeting image such that the game character image and the at least one targeting image are simultaneously movable.

38. A game machine including a display screen for displaying a game image and a touch panel covering the display screen, comprising:

a display controller that displays, on the display screen, a game image, including at least one targeting image selectable by a player and indicative of a target to be specified by a player and including a game character image that is different from the at least one targeting image;

a movement controller that moves the at least one targeting image substantially independent of the game character image so that the at least one targeting image at least temporarily passes over the game character image;

an input coordinate detector that detects, when the player provides an input onto the touch panel, input coordinates indicative of a position of the input on the display screen;

a specified coordinate determining mechanism that determines, when display coordinates of any one of the targeting images at the time of the input provided from the player onto the touch panel and the input coordinates are within a predetermined range, that the targeting image has been specified by the player, and determines, based on at least one of a position represented by the display coordinates and a position represented by the input coordinates, specified coordinates indicative of a position specified by the player; and a parameter updater that varies a characteristic parameter indicative of a characteristic of a game character represented by the game character image, based on a positional relation between the specified coordinates and the game character image.

39. The game machine according to claim 38, wherein the game character is a player character controlled based on input from the player.

40. The game machine according to claim 38, wherein the game image also includes a player character that is controlled based on input from the player, and the game character is an enemy character.

41. The game machine according to claim 38, wherein the game character image is movable independent of the at least one targeting image such that the game character image and the at least one targeting image are simultaneously movable.

42. A game machine including a display screen for displaying a game image and a touch panel covering the display screen, comprising:
- a display controller that displays, on the display screen, a game image, including a game character image and a targeting image selectable by a player and indicative of a target to be specified by a player and including a game character image that is different from the targeting image;
- a movement controller that moves the targeting image substantially independent of the game character image so that targeting image at least temporarily passes over the game character image;
- an input coordinate detector that detects, when the player provides an input onto the touch panel, input coordinates indicative of a position of the input on the display screen;
- a specified coordinate determining mechanism that determines, when display coordinates of the targeting image at the time of the input provided from the player onto the touch panel and the input coordinates are within a predetermined range, that the targeting image has been specified by the player, and determines, based on at least one of a position represented by the display coordinates and a position represented by the input coordinates, specified coordinates indicative of a position specified by the player; and
- a parameter updater that varies a characteristic parameter, indicative of a characteristic of a game character represented by the game character image, based on a positional relation between the specified coordinates and the game character image.

43. The game machine according to claim 42, wherein the game character is a player character controlled based on input from the player.

44. The game machine according to claim 42, wherein the game image also includes a player character that is controlled based on input from the player, and the game character is an enemy character.

45. The game machine according to claim 42, wherein the game character image is movable independent of the targeting image such that the game character image and the targeting image are simultaneously movable.

46. A game machine including a display screen for displaying a game image and a touch panel covering the display screen, comprising:
- a display controller that displays, on the display screen, a game image including at least one targeting image selectable by a player and indicative of a target to be specified by a player and including a game character image that is different from the at least one targeting image;
- a movement controller that moves the at least one targeting image substantially independent of the game character image on the game image;
- an input coordinate detector that detects, when the player provides an input onto the touch panel, input coordinates indicative of a position of the input on the display screen;
- a specified coordinate determining mechanism that determines, when display coordinates of any one of the targeting images at the time of the input provided from the player onto the touch panel and the input coordinates are within a predetermined range, specified coordinates indicative of a position specified by the player, based on at least one of a position represented by the display coordinates and a position represented by the input coordinates; and
- a game image changing mechanism that changes a display state of the game image, based on a positional relation among positions represented by the specified coordinates determined by the specified coordinate determining means.

47. The game machine according to claim 46, wherein the game character is a player character controlled based on input from the player.

48. The game machine according to claim 46, wherein the game image also includes a player character that is controlled based on input from the player, and the game character is an enemy character.

49. The game machine according to claim 46, wherein the game character image is movable independent of the at least one targeting image such that the game character image and the at least one targeting image are simultaneously movable.

* * * * *